United States Patent [19]
Nishiyama et al.

[11] Patent Number: 6,141,112
[45] Date of Patent: Oct. 31, 2000

[54] SHARED MEMORY IMAGE FORMING SYSTEM

[75] Inventors: Hidetomo Nishiyama, Yamatokoriyama; Yasuhiro Nakai, Soraku-gun; Syoichiro Yoshiura, Tenri, all of Japan

[73] Assignee: Sharp Kabushiki Kaisha, Osaka, Japan

[21] Appl. No.: 09/523,805

[22] Filed: Mar. 13, 2000

Related U.S. Application Data

[62] Division of application No. 08/779,722, Jan. 7, 1997, Pat. No. 6,067,168.

[30] Foreign Application Priority Data

Feb. 23, 1996 [JP] Japan .................................. 8-036975
Feb. 23, 1996 [JP] Japan .................................. 8-036982

[51] Int. Cl.⁷ .................................................. B41B 15/00
[52] U.S. Cl. ..................... 358/1.16; 358/1.14; 358/1.15; 358/296
[58] Field of Search ................. 358/1.13–1.18, 358/400–402, 296, 300, 500–504, 448, 468; 399/1, 144, 8; 709/223, 200, 201; 710/16, 104, 8; 700/5, 19

[56] References Cited

U.S. PATENT DOCUMENTS

| | | | |
|---|---|---|---|
| 4,797,706 | 1/1989 | Sugishima et al. ................. | 358/300 |
| 5,287,194 | 2/1994 | Lobiondo ................................ | 358/296 |
| 5,339,168 | 8/1994 | Evanitsky et al. ..................... | 358/402 |
| 5,564,109 | 10/1996 | Snyder et al. ........................... | 710/8 |
| 5,642,208 | 6/1997 | Takahashi et al. ...................... | 358/501 |
| 5,652,830 | 7/1997 | Yamamoto et al. ................... | 358/1.16 |
| 5,689,755 | 11/1997 | Ataka .......................................... | 399/8 |
| 5,854,693 | 12/1998 | Yoshiura et al. ...................... | 358/468 |
| 5,907,669 | 5/1999 | Yoshiura et al. ...................... | 358/1.16 |
| 5,974,233 | 10/1999 | Nishiyama et al. ................... | 395/1.16 |
| 5,987,225 | 11/1999 | Okano ................................... | 358/1.13 |
| 5,995,721 | 11/1999 | Rourke et al. ......................... | 358/1.15 |

FOREIGN PATENT DOCUMENTS

| | | | |
|---|---|---|---|
| 0 613 287 A1 | 2/1994 | European Pat. Off. ......... | H04N 1/32 |
| 53-116834A | 10/1978 | Japan .............................. | G03G 13/04 |

*Primary Examiner*—Leo H. Boudreau
*Assistant Examiner*—Ishrat Sherali
*Attorney, Agent, or Firm*—David G. Conlin; Peter J. Manus; Dike, Bronstein, Roberts & Cushman

[57] ABSTRACT

An image forming system, wherein a second digital copying machine stores image data temporarily on behalf of a first digital copying machine at its request and returns the stored image data upon receipt of a return request. When the second digital copying machine has not received any return request from the first digital copying machine within a predetermined period, the second digital copying machine erases the stored image data to utilize its own memory efficiently.

5 Claims, 27 Drawing Sheets

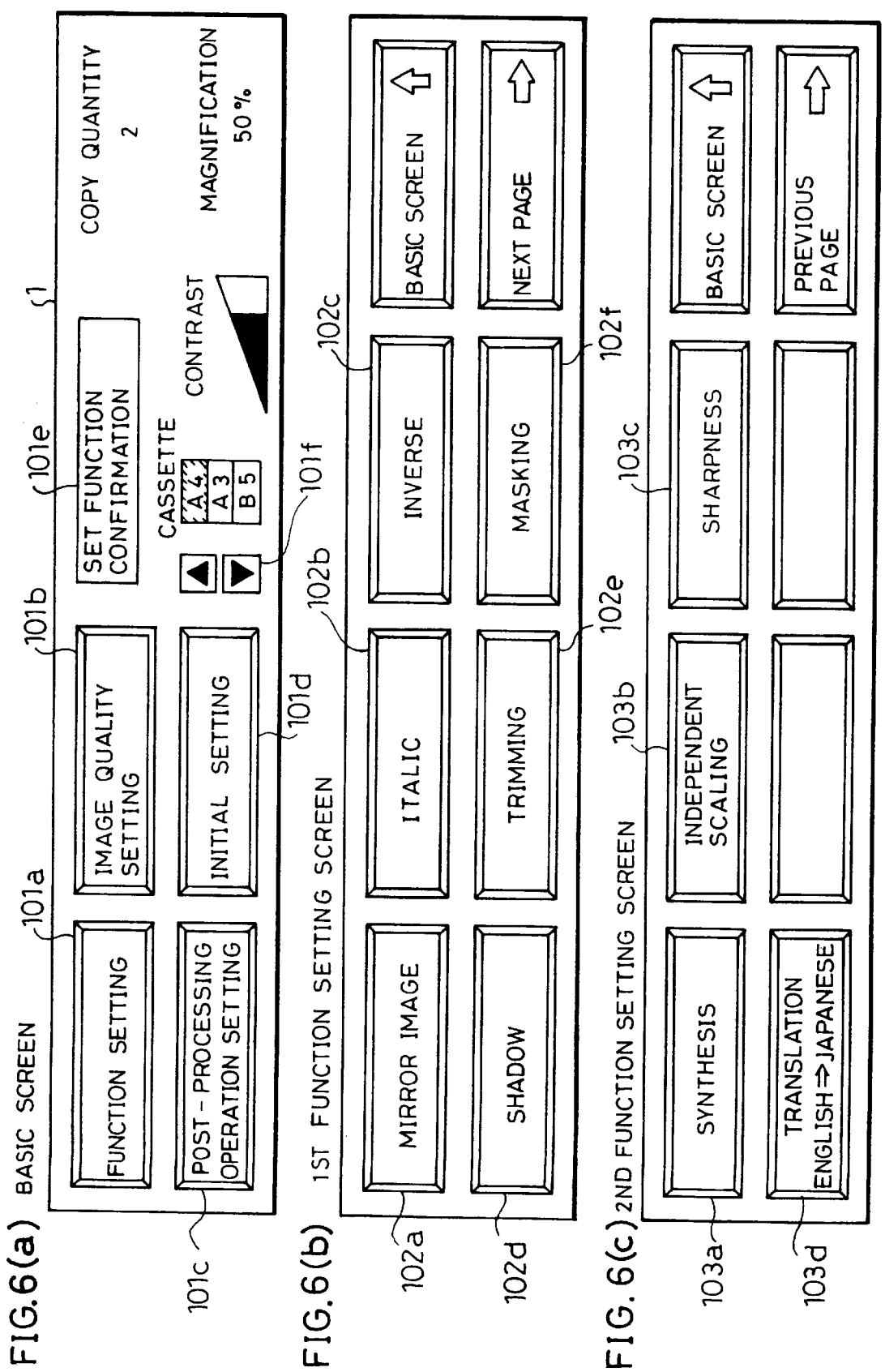

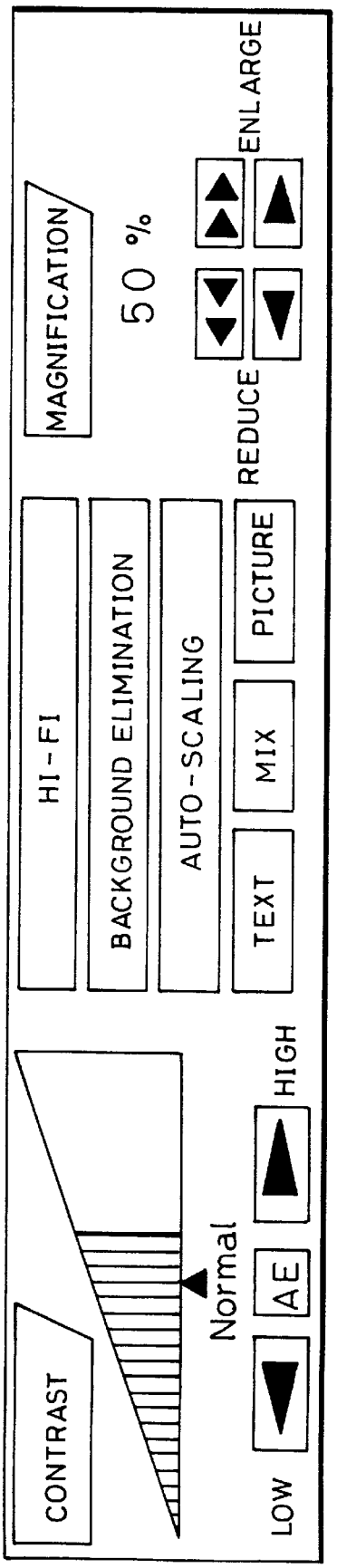
FIG. 7(a) IMAGE QUALITY SETTING SCREEN
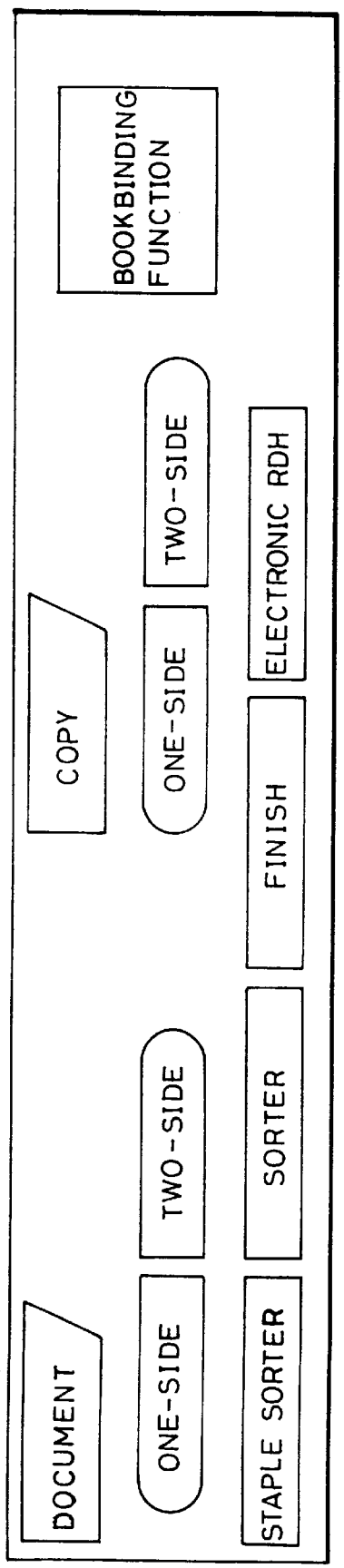
FIG. 7(b) POST-PROCESSING OPERATION SETTING SCREEN

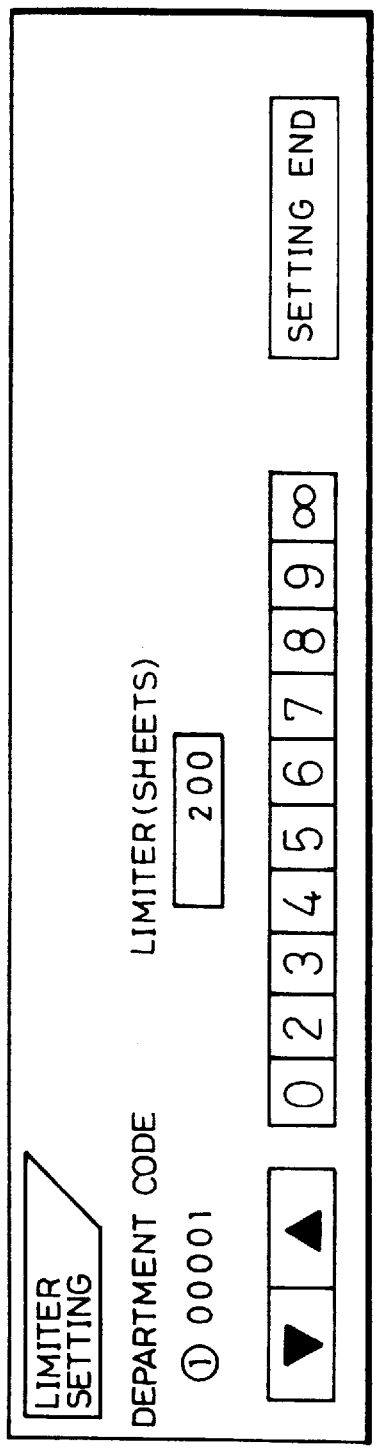
FIG. 9(a) LIMITER SETTING SCREEN
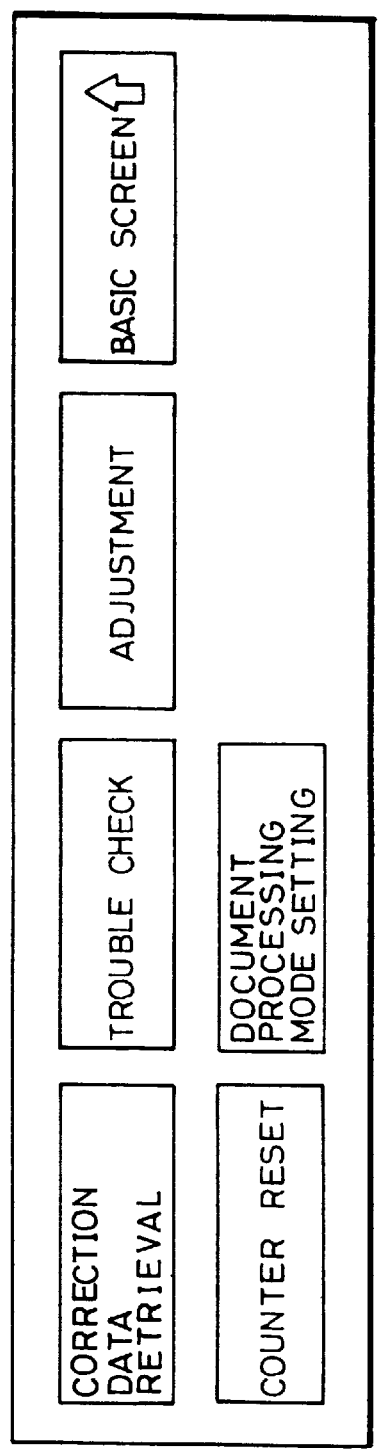
FIG. 9(b) SIMULATION SCREEN FIG. 17(a)
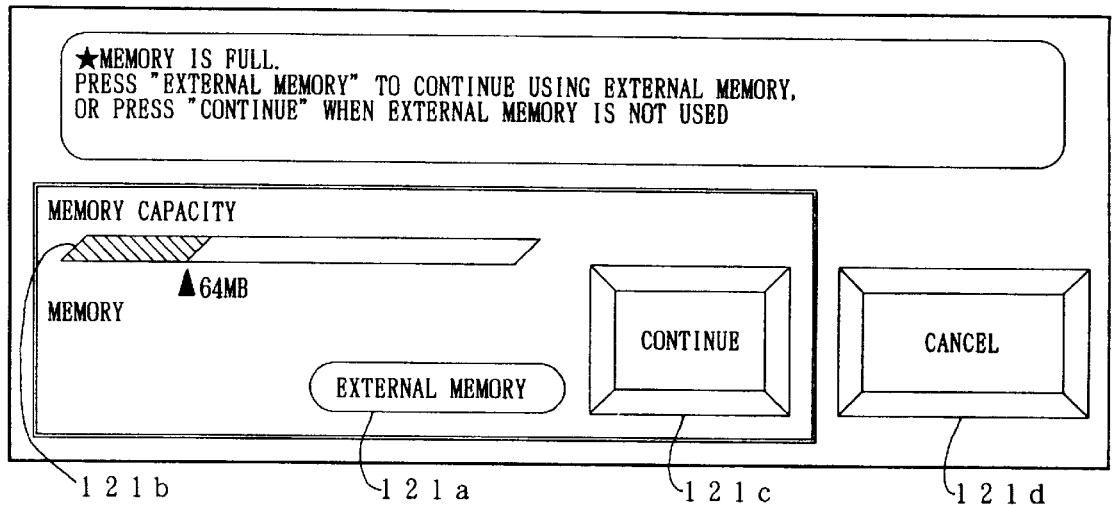
FIG. 17(b) (WHEN EXTERNAL MEMORY SELECTION KEY IS PRESSED)
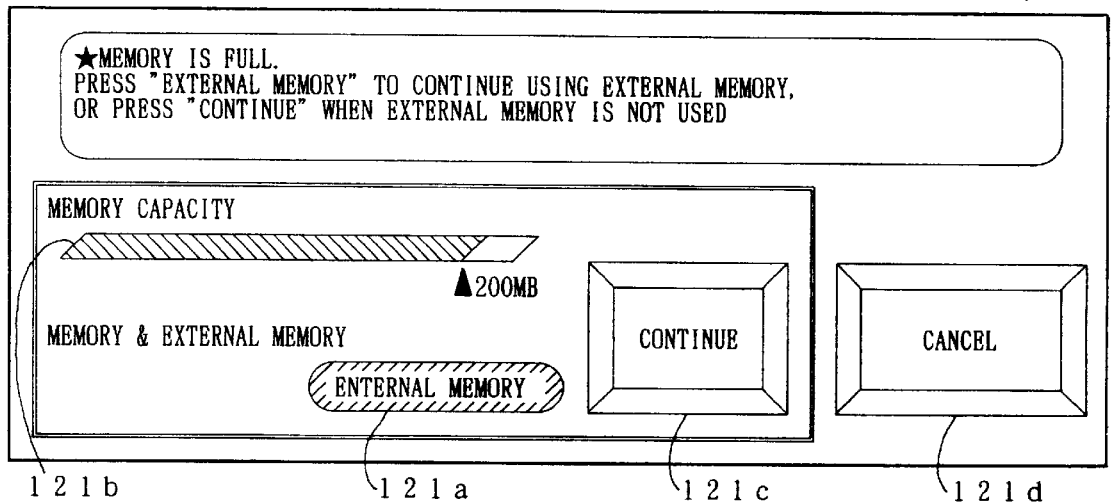
FIG. 17(c) (WHEN CONTINUE KEY IS PRESSED)
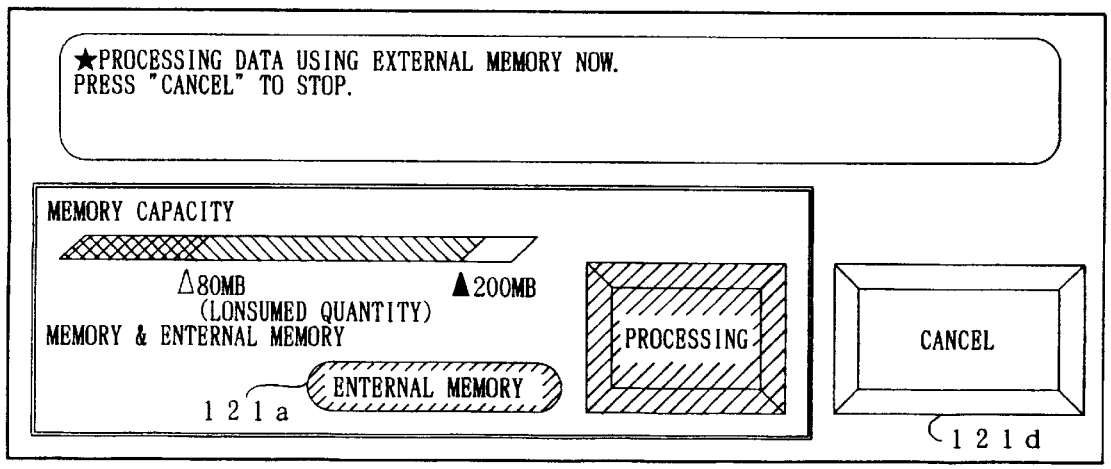

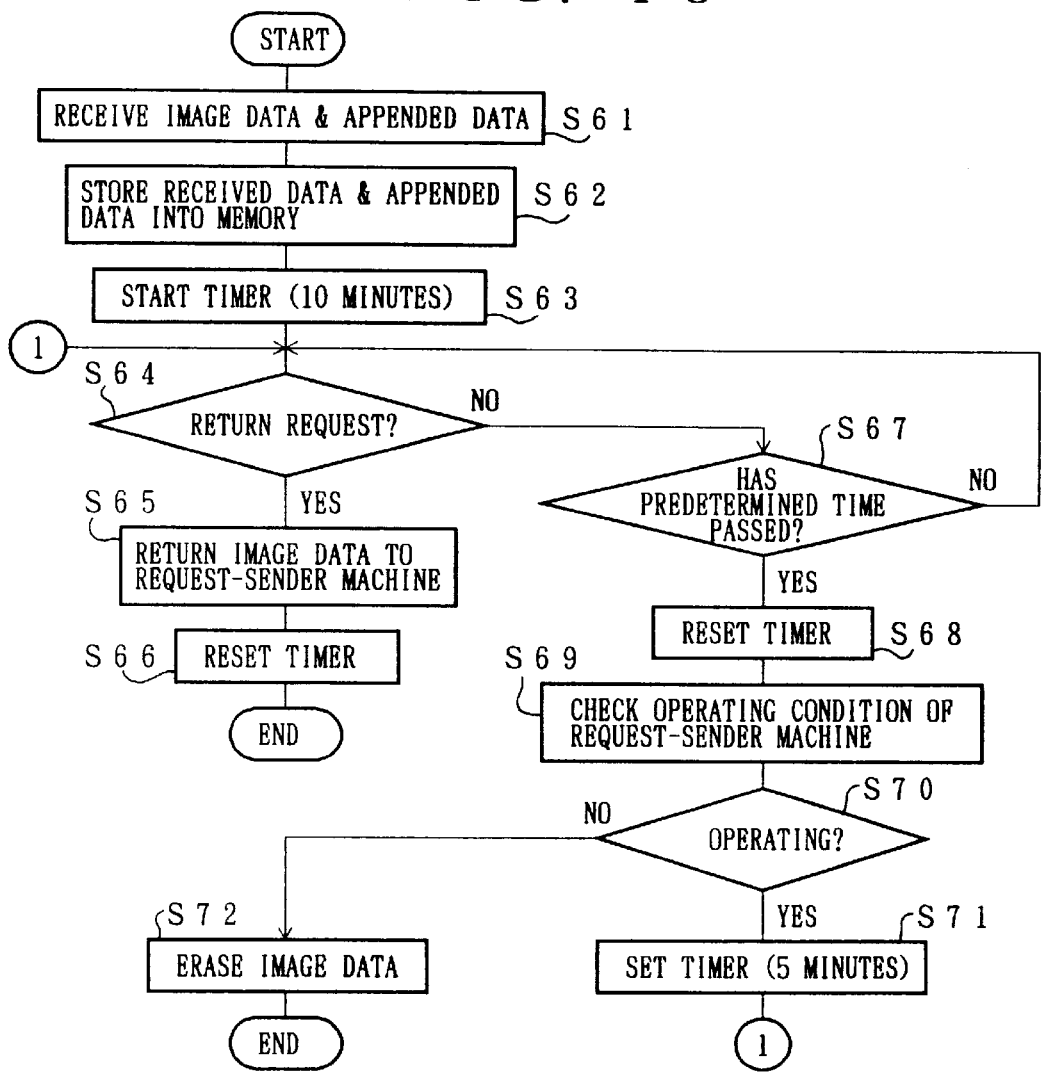

SHARED MEMORY IMAGE FORMING SYSTEM

REFERENCE TO RELATED APPLICATION

This is a Divisional Application of the continued prosecution application ("CPA") filed on Jun. 10, 1999 under 37 CFR 53(d) to continue the prosecution of Ser. No. 08/779,722, filed Jan. 7, 1997 U.S. Pat. No. 6,067,168. This CPA is now allowed, and the contents are incorporated herein by reference.

FIELD OF THE INVENTION

The present invention relates to an image forming system comprising a plurality of image forming apparatus, such as digital copying machines, which are interconnected through a transmitting apparatus.

BACKGROUND OF THE INVENTION

A digital copying machine, an example commercialized image forming apparatus, reads an original image by means of an image read section to process the read original image in a specified manner by means of an image processing section, and prints out the processed image data by means of a recording section as a copy image. Thus, the digital copying machine of this type produces an image on a sheet using only the image processing functions pre-installed therein.

On the other hand, an idea of forming a network by interconnecting a plurality of image recording apparatus or the like has been proposed recently. For example, Japanese Laid-Open Patent Application No. 116834/1978 (Tokukaisho 53-116834) discloses an arrangement to interconnect a plurality of image reading apparatuses and a plurality of image recording apparatuses through a single control section.

This arrangement enables each image recording apparatus to output a copy of an original image read by any of the above image reading apparatuses. Thus, when more than one kind of document is copied, each kind of document is set to a separate image reading apparatus and the copy is made by a single image recording apparatus, thereby reducing an idle time of the image recording apparatus compared with a case where each kind of document is set in a single image reading apparatus.

Also, Japanese Examined Patent Publication No. 36592/1995 (Tokukouhei 7-36592) discloses an image forming system including a plurality of copying machines interconnected through a single control apparatus, and each copying machine is furnished with an image read section and an image record section. In this system, image signals subject to recording are distributed to more than one copying machine according to a specified copying mode, so that those who received the image signals can carry out the copying operation in parallel.

However, the above conventional image forming systems has a number of problems.

To begin with, each image processing function of the digital copying machine depends on a software program, which has been developed at an increasing pace. Thus, the image processing function is upgraded in a short period and new models with additional functions have been steadily commercialized. Therefore, the state-of-the-art digital copying machine with desired image processing functions becomes an outdated model with relatively low level functions as soon as the user purchases it.

Because the user can neither upgrade the functions of his digital copying machine nor simply add new functions, if he wants higher level or new functions, he has to purchase a new model. This is an economic burden for the user and a manufacturers' problem accompanying with their efforts in always meeting users' demands.

The same can be said about a memory capacity of the digital copying machine. To be more specific, most of the higher level image processing functions, such as an electronic RDH (Recycle Document Handler) function, are feasible only when the digital copying machine has a large memory.

A possible solution to the above problem would be interconnecting copying machines through a transmitting apparatus to enable them to share their memories, a practical arrangement of which, however, has not been discussed in any of the prior art documents.

In addition, suppose that a first copying machine requests a second copying machine to store the transmitted data on its behalf, then, the second copying machine eventually accumulates a great volume of image data for a considerable period unless the first copying machine issues a return request of the image data. Thus, the memory of the second copying machine is occupied by the image data from the first copying machine. This limits the memory function of the second copying machine, in other words, this causes an insufficient memory at the second copying machine's end, thereby hindering the full performance of the second copying machine.

SUMMARY OF THE INVENTION

It is therefore an object of the present invention to provide an image forming system, in which an image processing apparatus can share its memory with another image processing apparatus while reducing the capacitive burden of the shared memory.

The above object is fulfilled by an image forming system furnished with a first image forming apparatus, a second image forming apparatus, and a transmitting apparatus for connecting the first and second image forming apparatuses for mutual image data transmission, wherein, (1) the first image forming apparatus includes:
- a recording section for forming a visible image based on image data;
- a command input section for inputting an action command; and
- a control section for transferring the image data from the first image forming apparatus to the second image forming apparatus through the transmitting apparatus at a command, inputted through the command input section, to issue a store request to the second image forming apparatus to store the image data on behalf of the first image forming apparatus, and (2) the second image forming apparatus includes:
- a storage section for storing image data;
- a control section for storing the transferred image data from the first image forming apparatus into the storage section, and for returning the stored image data to the first image forming apparatus through the transmitting apparatus at a return request issued by the first image forming apparatus; and
- an erasing section for erasing the stored image data in the storage section.

When the first image forming apparatus reads a document of plurality of pages using, for example, the electronic RDH (Recycle Document Handler) function, a data volume may exceed a capacity of the memory thereof in some cases.

However, the above arrangement can solve this problem. To be more specific, the operator inputs a command into the first image forming apparatus through the command input unit, directing the same to request the second image forming apparatus to store the image data on its behalf. Upon receipt of such a command, the control unit of the first image forming apparatus starts to transfer the image data to the second image forming apparatus through the transmitting apparatus. The image data can be transferred either partially or entirely.

Then, the second image forming apparatus stores the transferred image into its storage unit, and returns the stored image data to the first image forming apparatus upon receipt of the return request therefrom.

The first image forming apparatus processes the returned image data using specified functions and supplies the processed image data to the recording unit, which outputs the supplied image data in the form of a visible image.

According to the above arrangement, the first image forming apparatus can process the image data while using the storage unit of the second image forming apparatus.

If the first image forming apparatus has not issued the return request for a considerable period, the transferred image data are accumulated in the storage unit of the second image forming apparatus. Under these conditions, the memory of the second image forming apparatus eventually becomes insufficient, thereby causing some trouble in its operation.

To eliminate this problem, the erasing unit erases the image data in the storage unit as occasion demands.

Therefore, in the present image forming system, the first image forming apparatus can use the storage unit of the second image forming apparatus while eliminating operation troubles possibly causing at the second image forming apparatus's end.

For a fuller understanding of the nature and advantages of the invention, reference should be made to the ensuing detailed description taken in conjunction with the accompanying drawings.

BRIEF DESCRIPTION OF THE DRAWINGS

FIG. 6(*a*) is a front view showing a basic screen of a liquid crystal display device in the above control panel;

FIG. 6(*b*) is a front view showing a first function setting screen;

FIG. 6(*c*) is a front view showing a second function setting screen;

FIG. 7(*a*) is a front view showing an image quality setting screen of the liquid crystal display device in the above control panel;

FIG. 7(*b*) is a front view showing a post-processing operation setting screen of the liquid crystal display device in the above control panel;

FIG. 8(*a*) is a front view showing an initial setting screen of the liquid crystal display device in the above control panel;

FIG. 8(*b*) is a front view showing a finger print registration screen of the liquid crystal display device in the above control panel;

FIG. 8(*c*) is a front view showing a department management setting screen of the liquid crystal display device in the above control panel;

FIG. 9(*a*) is a front view showing a limiter setting screen of the liquid crystal display device in the above control panel;

FIG. 9(*b*) is a front view showing a simulation screen of the liquid crystal display device in the above control panel;

FIG. 12(*b*) is a front view of the above liquid crystal display device in the control panel after an italic function is selected;

FIG. 12(*c*) is a front view of an italic setting screen of the above liquid crystal display device in the control panel;

FIG. 13(*b*) is a front view of the above liquid crystal display device in the control panel when S4 of FIG. 15 is being carried out;

FIG. 13(*c*) is a front view of a sharpness setting screen of the above liquid crystal display device in the control panel;

FIG. 17(*a*) is a front view of the above liquid crystal display device in the control panel when S37 of FIG. 16 is being carried out;

FIG. 17(*b*) is a front view of the above liquid crystal display device in the control panel after an external memory key of FIG. 17(*a*) is pressed;

FIG. 17(*c*) is a front view of the above liquid crystal display device in the control panel after a continue key is pressed;

FIG. 18 is a flowchart detailing an operation of an image forming system in accordance with another example embodiment of the present invention, and it details an operation of erasing image data stored on behalf of another digital copying machine at its request;

DESCRIPTION OF THE EMBODIMENTS (Embodiment 1)

Referring to FIGS. 1–17, the following description will describe an example embodiment of the present invention.

Figure 2:
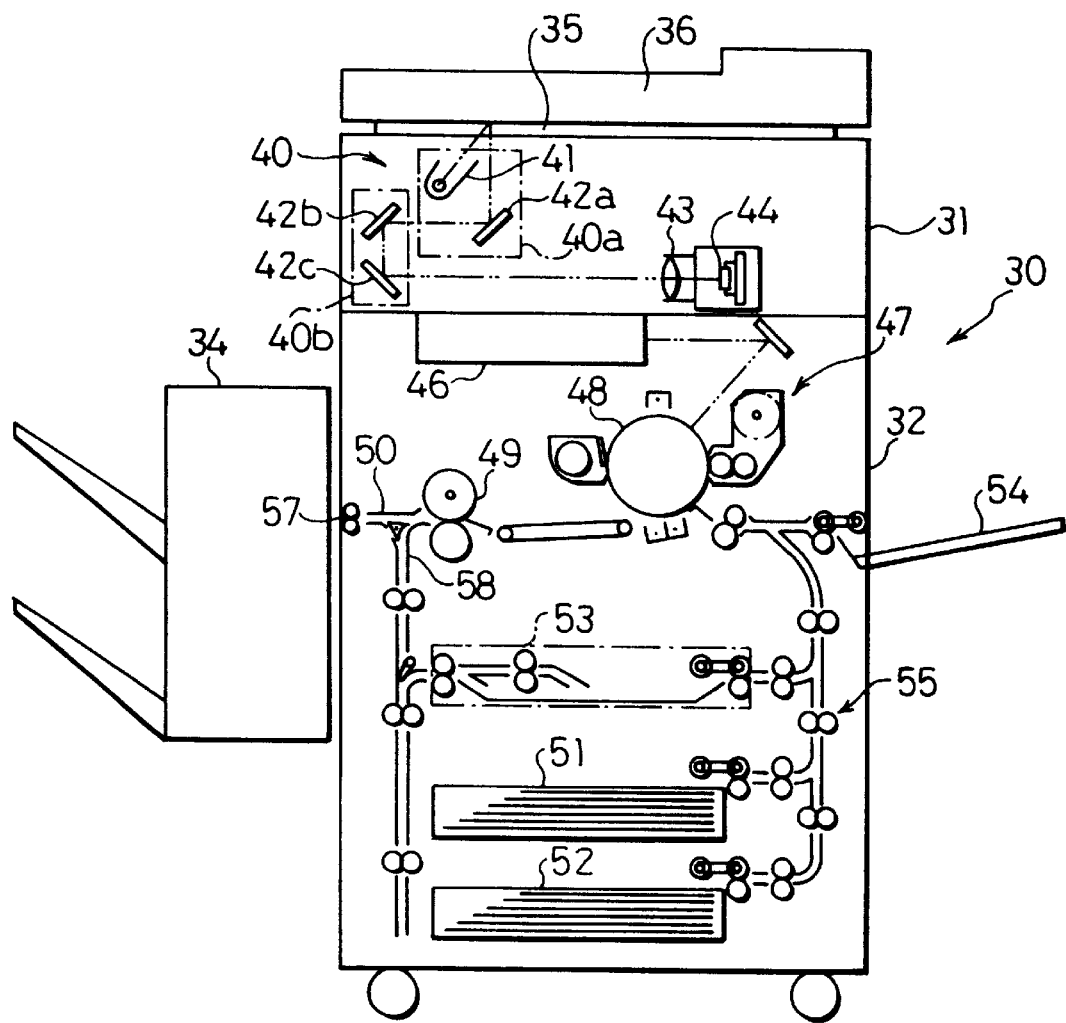
FIG. 2 is a longitudinal section of a digital copying machine in the above image forming system.

An image forming system of the present embodiment comprises a plurality of digital copying machines interconnected through a transmitting apparatus. FIG. 2 is a cross section showing an entire structure of a digital copying machine 30 as an example of the above digital copying machine. As shown therein, the digital copying machine 30 includes a scanner section 31, a laser printer section 32 serving as recording means, and a post-processing operation device 34 having a sorter.

The scanner section 31 includes a document table 35 made of transparent glass, an RADF (Recirculating Automatic Document Feeder) 36 for automatically feeding documents to the document table 35, and an original image read unit, that is, a scanner unit 40 for reading an original image of a document set on the document table 35 through scanning. The original image read by the scanner unit 40 is sent to an image processing section, which will be described below, in the form of image data to be processed in a specified manner.

The RADF 36 is a device for automatically feeding a pile of a document set on an attached document tray to the document table 35 per sheet. The RADF 36 includes a transportation path for a one-side document and a transportation path for a two-side document as well as transportation path switching mechanism, so that the scanner unit 40 can read either side or both sides of the document at operator's choice.

The scanner unit 40 includes a first scanning unit 40a, a second scanning unit 40b, an optical lens body 43, and a CCD (Charge Coupled Device) 44. The first scanning unit 40a is composed of a lamp reflector assembly 41 for scanning a sheet of the document on the document table 35 by irradiating light on the sheet surface, and a first reflecting mirror 42a.

The second scanning unit 40b is composed of a second reflecting mirror 42b and a third reflecting mirror 42c. The first through third reflecting mirrors 42a–42c are provided to guide light reflected from the sheet of the document to the CCD 44. The optical lens body 43 forms an image on the CCD 44 by converging the reflected light thereon, and the CCD 44 is an element which converts the image formed by the reflected light into an electric image signal.

The scanner section 31 reads an original image to convert the same into image data by the link-up operation of the RADF 36 and scanner unit 40. More specifically, while the RADF 36 steadily feeds the document per sheet onto the document table 35, the scanner unit 40 reads the original image on each sheet by moving back and forth along the bottom surface of the document table 35.

The image data obtained by the scanner unit 31 are sent to the image processing section to be processed in various manners as specified, and the processed image data are temporarily stored in a memory 73 therein, which will be described in detail below. Subsequently, the image data are supplied to the laser printer section 32 at an output command, and recorded on a sheet in the form of an image.

The laser printer section 32 includes a laser writing unit 46 and an electrophotographic processing portion 47 for forming an image in its upper half region, and a sheet containing.transporting portion 55 in its lower half region. The laser writing unit 46 includes a semiconductor laser for emitting a laser beam in response to the image data from the memory 73, a polygonal mirror for deflecting the laser beam at isometric speed, an f-θ lens for correcting the above deflected laser beam to be deflected at a constant velocity on a photosensitive drum 48 of the electrophotographic processing portion 47, etc.

The electrophotographic processing portion 47 is arranged in a known manner, that is, the same includes the photosensitive drum 48, and around which a charger, a developer, a transferring device, a separator, a cleaner, a fuser 49, etc. are provided. A transportation path 50 is formed in the downstream side of the fuser 49 with respect to a direction in which a sheet is transported to have an image formed thereon. The transportation path 50 branches into two paths: a transportation path 57 and a transportation path 58 that communicate with the post-processing operation device 34 and sheet containing.transporting portion 55, respectively.

The sheet containing.transporting portion 55 includes a first cassette 51, a second cassette 52, a two-side copying unit 53, and a multi-manual tray 54. The first and second cassettes 51 and 52 contain piles of sheets of different sizes, respectively. When the operator selects either cassette containing the sheets of the desired size, the sheets are steadily fed to the electrophotographic processing portion 47 one by one from the top of the pile in the selected cassette. The two-side copying unit 53 supplies a sheet having formed an image thereon to the electrophotographic processing portion 47, either directly or after turning the sheet over.

In the laser printer section 32, the image data retrieved from the memory 73 are outputted from the laser writing unit 46 in the form of a laser beam to form an electrostatic latent image on the surface of the photosensitive drum 48 in the electrophotographic processing unit 47. Then, the electrostatic latent image is turned into a visible toner image, which is electrostatically transferred onto a sheet transported from the sheet containing.transporting portion 55 and fused thereon by the fuser 49.

After the image is formed thereon, the sheet is sent to the post-processing operation device 34 from the fuser 49 through the transportation path 50, or supplied again to the electrophotographic processing portion 47 through the transportation paths 50 and 58 and two-side copying unit 53.

Figure 3:
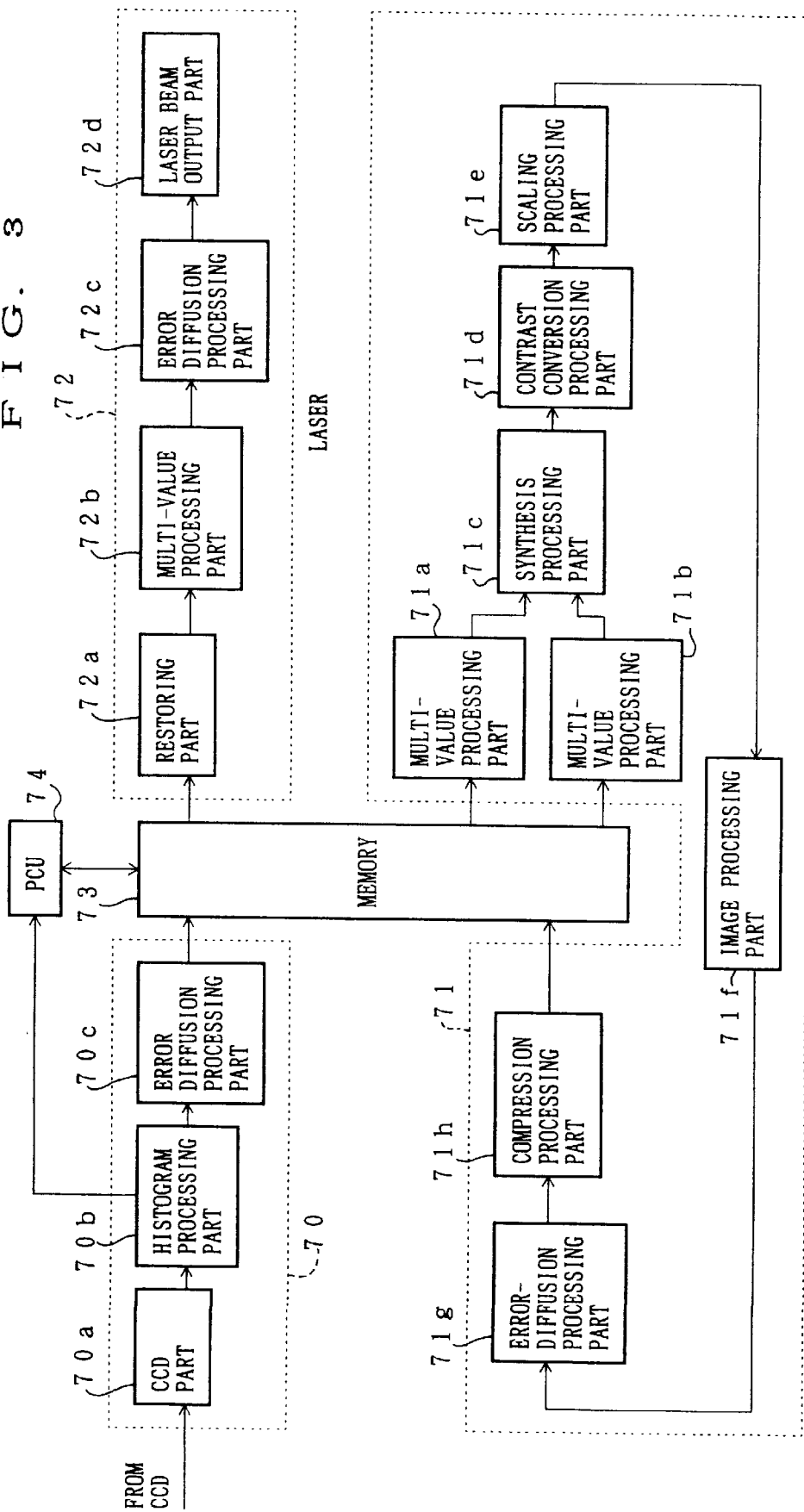
FIG. 3 is a block diagram depicting a structure of an image processing section in the above digital copying machine.

Next, the image processing section of the digital copying machine 30 will be explained. The image processing section processes the image data of the document sent from the scanner unit 31. As shown in FIG. 3, the image processing section includes an image data input portion 70, an image data processing portion 71, an image data output portion 72, the above-mentioned memory 73 serving as storage means, and a PCU (Print Control Unit) 74 serving as control means.

The digital copying machine 30 is under the control of the PCU 74, which is composed of a CPU (Central Processing Unit). The memory 73 is composed of a RAM (Random Access Memory), a hard disk, etc., to store the image data.

The image data input portion 70 includes a CCD part 70a, a histogram processing part 70b, and an error diffusion processing part 70c. The image data input portion 70 converts the image data of the original image read by the CCD 44 into binary data, and makes a histogram of digital amount of the binary data to process the image data through the error diffusing method, and stores the resulting data into the memory 73 temporarily.

The CCD part 70a converts an analog signal representing the contrast of each pixel in the image data into a digital signal, and subsequently carries out an MTF (Modulation Transfer Function) correction, a black-and-white correction, or a gamma correction on the digital signal. Then, the CCD part 70a outputs the resulting 256-level (8-bit) digital signal to the histogram processing part 70b.

The histogram processing part 70b produces contrast data (histogram data) by adding up the digital signal outputted from the CCD part 70a separately in the 256-level pixel contrast. The histogram data thus obtained are sent to the error diffusion processing part 70c, or to the PCU 74 when occasion demands as pixel data.

The error diffusion processing part 70c employs the error diffusing method known as a method of pseudo-half-tone processing. To be more specific, an error caused by converting a pixel into binary data is reflected when converting the adjacent pixels into binary data. Thus, an 8-bit/pixel digital signal outputted from the CCD part 70a is converted into 1-bit (binary data) digital signal and a redistribution computation is carried out to produce a copy image rendering contrast as true as to an original in any specific region.

The image data processing portion 71 includes a multi-value processing parts 71a and 71b, a synthesis processing part 71c, a contrast conversion processing part 71d, a scaling processing part 71e, an image processing part 71f, and an error diffusion processing part 71g, and a compression processing part 71h. The image data processing portion 71 is a processing portion that converts input image data into image data the operator desires. Thus, the input image data are processed by the image data processing portion 71 until the final output image data are stored in the memory 73. Note that, however, the aforementioned processing parts in the image data processing portion 71 are arranged to operate separately only when occasion demands.

The multi-value processing parts 71a and 71b convert the binary image data from the error diffusion processing part 70c into 256-level data. The synthesis processing part 71c carries out a logical computation for every pixel, in other words, it selectively computes an OR, an AND, and an exclusive-OR. The data subject to the logical computation are the image data stored in the memory 73 and bit data from a pulse generator (PG).

The contrast conversion processing part 71d sets an arbitrary relationship between the input contrast and output contrast for the 256-level data based on a predetermined level converting table. The scale processing part 71e carries out interpolation processing for a designated magnification based on the known input data to compute the pixel data (contrast value) of the subject pixel after the scaling. Subsequently, the image data are scaled in the sub-scanning direction first, and thence in the main scanning direction based on the pixel data thus computed.

The image processing part 71f processes the input image data in various manners, and collects data related to data array to extract the feature and the like. The error diffusion processing part 71g operates in the same manner as the error diffusion processing part 70c in the image data input portion 70. The compression processing part 71h compresses the binary data by a coding method known as the run-length. Note that the compression processing part 71f compressed the final output image in the final processing loop.

The image data output portion 72 includes a restoring part 72a, a multi-value processing part 72b, an error diffusion processing part 72c, and a laser beam output part 72d. The image data output portion 72 restores the compressed image data stored in the memory 73 to the 256-level data, and diffuses the error in quaternary data which, when formed into an image, renders a smoother half-tone representation than the one formed by the binary data, after which the image data output portion 72 transfers the resulting data to the laser beam output part 72d.

The restoring part 72a restores the data compressed by the compression processing part 71h. The multi-value processing part 72b operates in the same manner as the multi-value processing parts 71a and 71b in the image data processing portion 71. The error diffusion processing part 72c operates in the same manner as the error diffusion processing part 70c in the image data input portion 70.

The laser beam output part 72d converts the digital image data into a laser ON/OFF signal based on a control signal from an unillustrated sequence controller. The semiconductor laser in the laser writing unit 46 comes on or goes off based on the above ON/OFF signal to write an electrostatic latent image on the photosensitive drum 48.

The data entering into the image data input portion 70 and coming out from the image data output portion 72 are, as a general rule, stored in the memory 73 in the form of binary data to reduce an occupied space. However, the data may be stored in the form of quatanary data to maintain the quality thereof.

Figure 4:
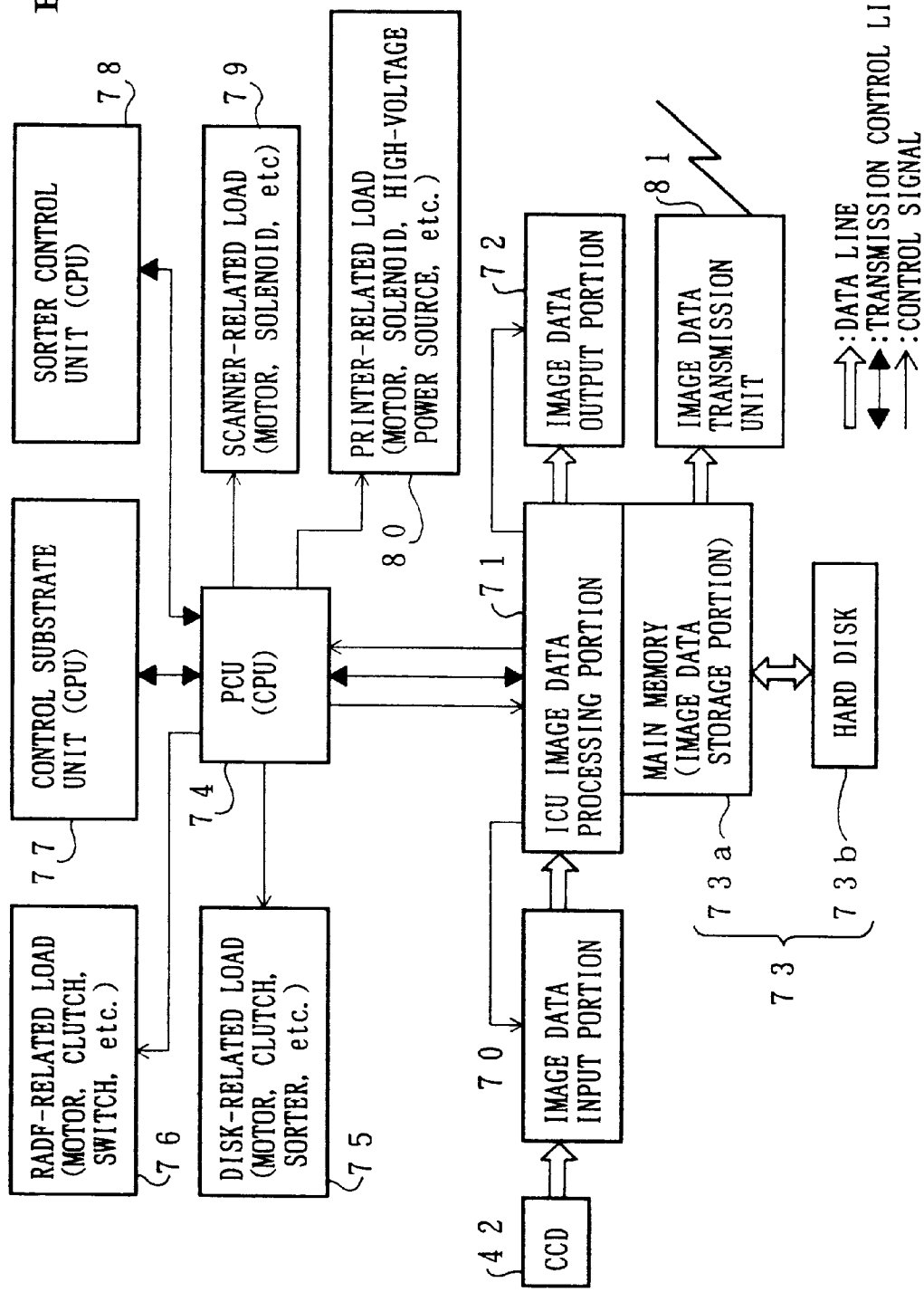
FIG. 4 is a block diagram depicting a structure of control mechanism of the above digital copying machine.

As has been explained, the PCU 74 controls the overall operation of the digital copying machine 30, and the control mechanism of the PCU 74 is illustrated in FIG. 4.

As shown in the drawing, the PCU 74 is connected to a disk-related load 75, an RADF-related load 76, a control substrate unit 77, a sorter control unit 78, a scanner-related load 79, a printer-related load 80, and the above-mentioned image data processing portion 71.

The PCU 74 manages the foregoing components separately using the sequence control by outputting a control signal to each. The disk-related load 75 is a load of the components other than the digital copying machine 30 main body, that is, a load of the motor of the sorter in the post-processing operation device 34, a clutch, etc. The RADF-related load 76 is a load of the motor, clutch, switch, etc. of the RADF 36. The scanner-related load 79 is a load of the motor, solenoid, etc. of the scanner unit 40. The printer-related load 80 is a load of the motor, solenoid, high-voltage power source, etc. of the electrophotographic processing portion 47. The sorter control unit 78 includes a CPU and controls the operation of the sorter based on the control signal from the PCU 74.

The control substrate unit 77 is an input section including a CPU, through which the operator sets a copying mode and the like or enters a command in the digital copying machine 30. The control substrate unit 77 transfers a control signal to the PCU 74 in response to the operator's input. For example, when the operator sets a copying mode, the PCU 74 controls the digital copying machine 30 to operate in the set mode using the above control signal. On the other hand, the PCU 74 transfers a control signal indicating the operating condition of the digital copying machine 30 to the control substrate unit 77. The control substrate unit 77 displays the current operating condition of the digital copying machine 30 on the display portion in response to the above control signal, thereby enabling the operator to confirm the current operating condition.

The memory 73, connected to the image data processing portion 71, is composed of a main memory 73a made of, for example, a semiconductor memory, and a hard disk 73b. An image data transmitting unit 81, connected to the main memory 73a, is provided to allow the mutual transmission between the digital copying machine 30 and the other digital data apparatuses with respect to the image data, image control signal and the like. The image data transmitting unit 81 corresponds, for example, an interface 93 a and a transmission line 96 in a digital copying machine 93 of FIG. 11.

Figure 5:
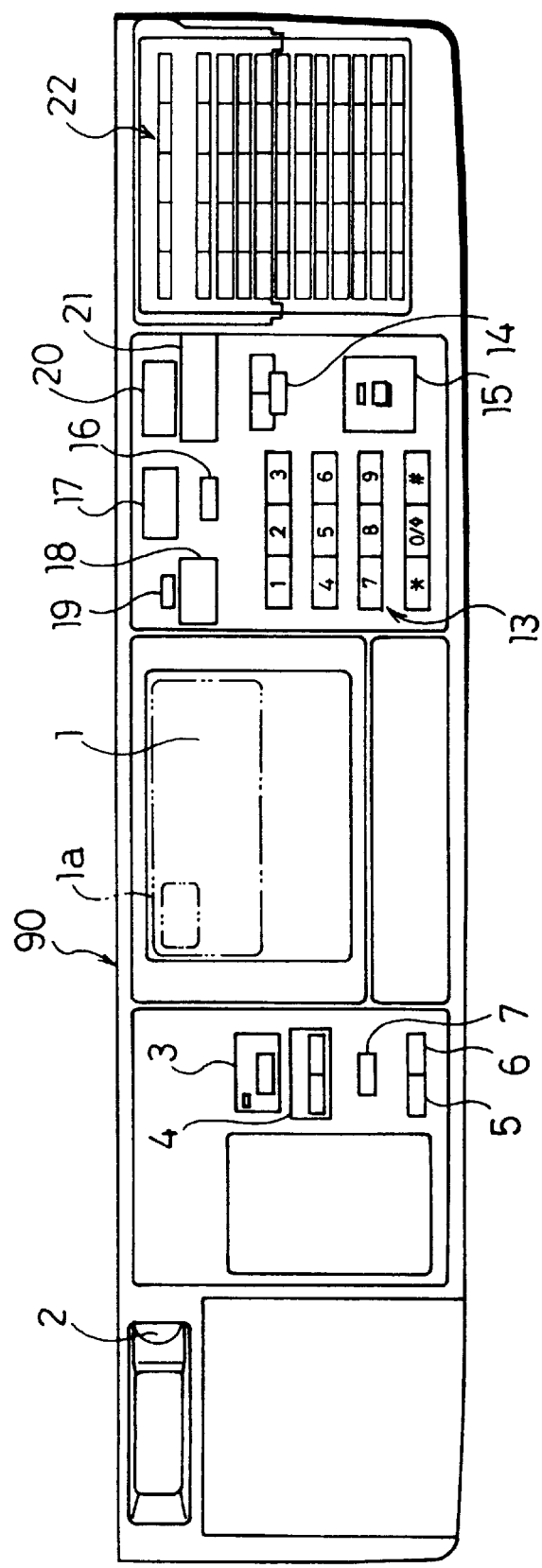
FIG. 5 is a front view of a control panel of the above digital copying machine.

The control substrate unit 77 includes a control panel 90 of FIG. 5 as command input means. The control panel 90 includes a touch panel type display portion at the center as a liquid crystal display device 1. A screen switch command area 1a is formed in a part of the screen of the liquid crystal display device 1. The screen switch command area 1a is provided to enable the operator to input a command to switch a display screen to a screen for selecting an image edit function he wishes to use. Although it will be described in detail below, when the operator directly presses the screen switch command area 1a with his finger, a list of edit functions is displayed on the screen of the liquid crystal display device 1 to enable the operator to select his desired edit function. Thus, the operator can set his desired edit function only by pressing the corresponding region on the display area with his finger.

As shown in FIG. 5, the control panel 90 includes a dial 2 at the left edge for controlling the brightness of the screen of the liquid crystal display device 1. A magnification auto-setting key 3, a set of zoom keys 4, two fixed magnification keys 5 and 6, and a 1× (equal size) key 7 are provided between the dial 2 and liquid crystal display device 1. The operator presses the magnification auto-setting key 3 when he wishes to set the digital copying machine 30 into a mode, in which an adequate copy magnification is automatically selected, and either zoom key 4 when he wishes to increase or decrease a copy magnification per 1%. The operator presses the fixed magnification key 5 or 6 when he wishes to select a fixed magnification, and the 1× key 7 when he wishes to reset a current copy magnification to the standard magnification (that is, 100%).

Also as shown in FIG. 5, the liquid crystal display device 1 includes a set of copy quantity keys 13, a clear key 14, a start key 15, an all clear key 16, an interruption key 17, a manipulation guide key 18, a message advancing key 19, a memory transmitting mode key 20, a copy/facsimile switching key 21, and a set of one-touch dial keys 22.

The operator presses the copy quantity key(s) 13 when he sets the desired copy quantity, and the clear key 14 when he wishes to reset the copy quantity or stop the continuous copying operation. The operator presses the start key 15 to start the copying operation, and the all clear key 16 when he wishes to reset all the set modes to standard. The operator presses the interruption key 17 when he wishes to make a copy while a continuous copying operation is being carried out, and the manipulation guide key 18 when he needs some help in manipulating the digital copying machine 30. When the manipulation guide key 18 is pressed, the manipulation instructions of the digital copying machine 30 are displayed on the liquid crystal display device 1. The operator presses the message advancing key 19 when he wishes to advance the messages displayed in response to the operator's pressing of the manipulation guide key 18.

The memory transmission mode key 20 and copy/facsimile mode switching key 21 are the set keys related to a facsimile mode. The operator presses the memory transmission mode key 20 when he wishes to send the document data after the document data are stored in the memory. The operator presses the copy/facsimile mode switching key 21 when he wishes to switch the digital copying machine 30 from the copy mode to the facsimile mode and vice versa. Each one-touch dial key 22 is arranged to remember a telephone number, so that the operator can make a phone call to a desired correspondent by a one-touch manipulating action.

The above is an example arrangement of the control panel 90 as to the kinds and alignment of the keys, and the control panel 90 may be modified depending on the model of its own digital copying machines 30.

The above liquid crystal display device 1 can display, for example, a basic screen of FIG. 6(a), a first function setting screen of FIG. 6(b), a second function setting screen of FIG. 6(c), an image quality setting screen of FIG. 7(a), a post-processing operation setting screen of FIG. 7(b), an initial setting screen of FIG. 8(a), a finger print registration screen of FIG. 8(b), a department management setting screen of FIG. 8(c), a limiter setting screen of FIG. 9(a), and a simulation screen of FIG. 9(b), as well as the other screens explained below.

The basic screen includes six areas: a function setting area, an image quality setting area, a post-processing operation setting area, an initial setting area, a set function confirmation manipulation area, and a cassette setting area, which are denoted as setting keys 101a–101f, respectively. The basic screen can additionally display the cassette, contrast, copy quantity, and magnification that have been set. When the operator manipulates the set function confirmation manipulation area, all the functions currently set in the present image forming system are displayed on the liquid crystal display device 1.

The first function setting screen includes six areas for setting edit functions: mirror image, italic, inverse, shadow, trimming, and masking, which are denoted as setting keys 102a–102f, respectively. Further, the first function setting screen includes two control areas: one for returning to the basic screen and the other for advancing to the next page screen. As soon as the operator presses the next page area, the screen switches to the second function setting screen.

The second function setting screen includes four areas: the first and second ones for setting edit functions, namely, synthesis and independent scaling, respectively; the third one for setting a sharpness function to highlight the image; and the fourth one for setting a translation function, which are denoted as setting keys 103a–103d, respectively. Further, the second function setting screen also includes two control areas: one for returning to the basic screen and the other for returning to the previous page.

The image quality setting screen includes eight areas for setting the contrast, HI-FI mode (high-quality copying mode), background elimination mode, auto-scaling mode, text mode, text-picture mix mode, picture mode, and magnification. Further, the image quality setting screen displays the contrast and magnification that have been set.

The post-processing operation setting screen includes an input area for specifying whether the document is one-sided or two-sided, another input area for specifying whether a copy is one-sided or two-sided, and an area for setting a bookbinding function. The post-processing operation setting screen further includes three areas for setting post-processing functions, namely, staple sorter, sorter, and finishing, as well as an area for setting the RDH (Recycle Document Handler) function.

The initial setting screen includes six mode setting areas: a finger print registration mode, a department management mode, a simulation mode, a maintenance management mode, a new function registration mode, and an output device selection mode. In addition, the initial setting screen includes a control area for returning to the basic screen.

The finger print register screen includes two input areas for inputting a department code and individual's name, respectively. As soon as the operator inputs the department code and individual's name, the input data are displayed in their respective input areas.

The department management setting screen includes several input areas, for example, one for setting a department code, and another for setting the number of staff members in the concerned department. As soon as the operator inputs the department code and the number of staff members and the like, the input data are displayed in their respective input areas.

Figure 10:
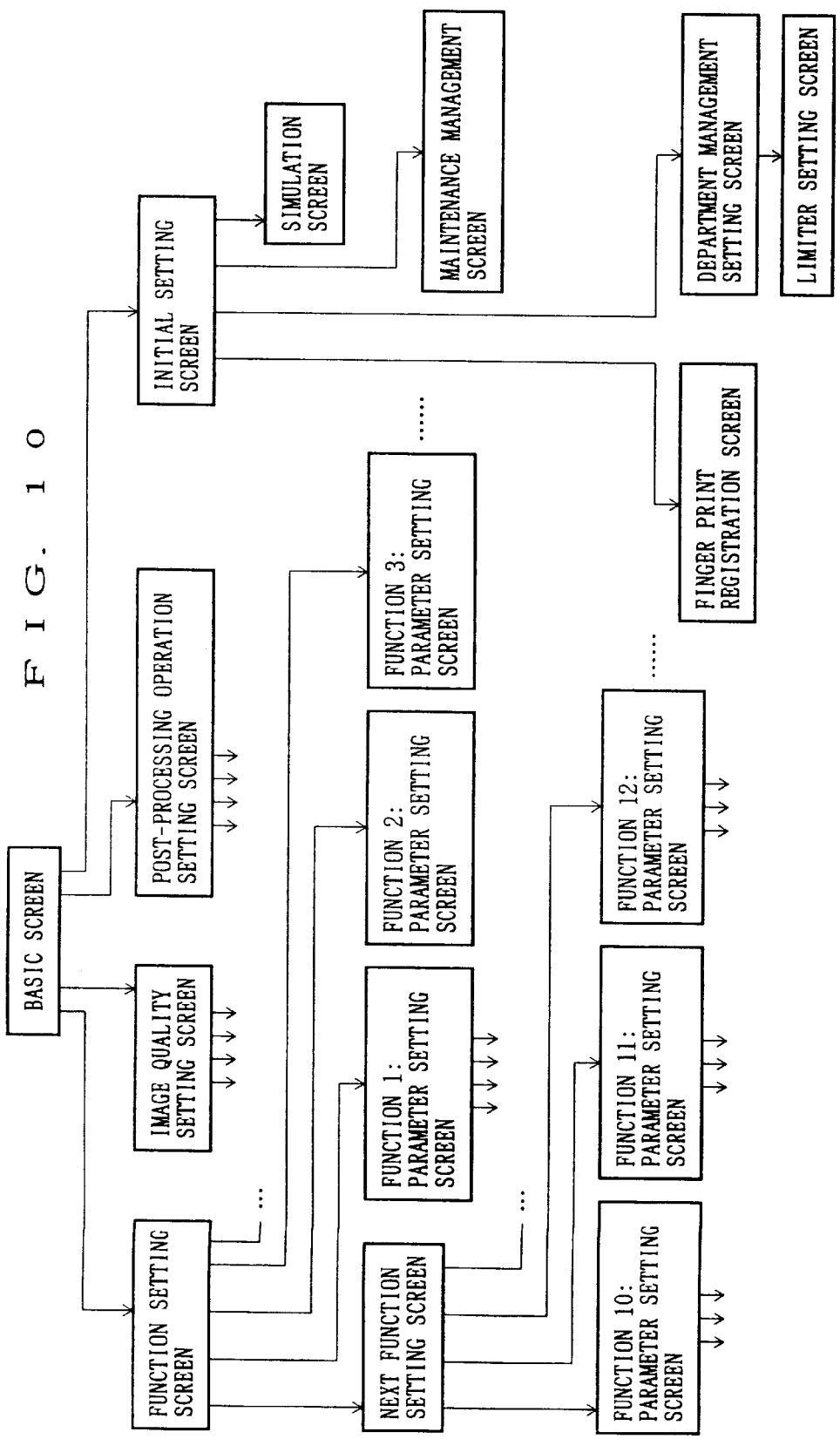
FIG. 10 is a diagram of the screens of the liquid crystal display device in the above control panel.

The foregoing screens switches as shown by the diagram of FIG. 10. To begin with, the liquid crystal display device 1 displays the basic screen, and as soon as the operator presses one of the function setting area, image-quality setting area, post-processing operation setting area, and initial setting area, the basic screen switches to the screen corresponding to the pressed area.

Figure 12A:
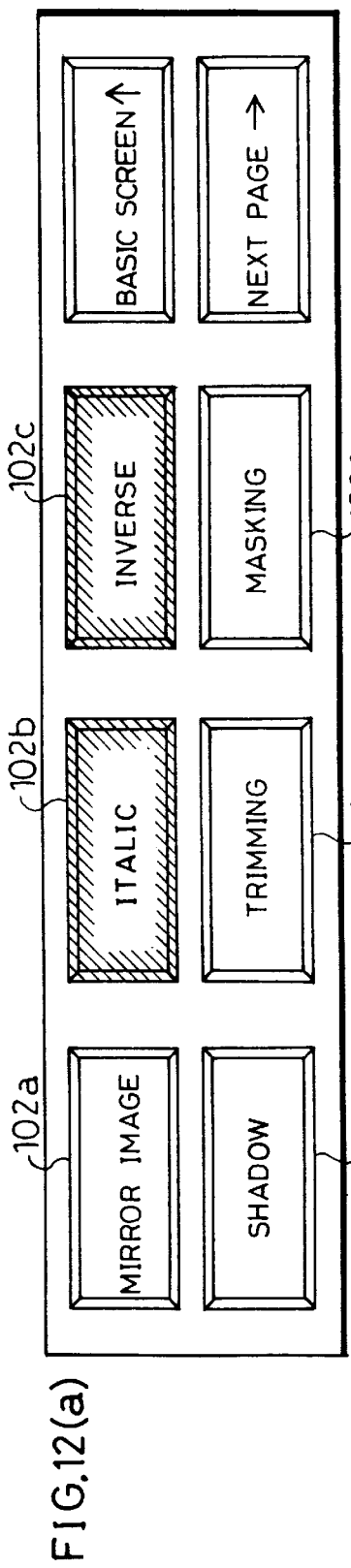
FIG. 12(*a*) is a front view of the first function setting screen of the liquid crystal display device in the control panel of FIG. 6(*b*) when the operator has selected image edit functions he wishes to use.
Figure 12B:
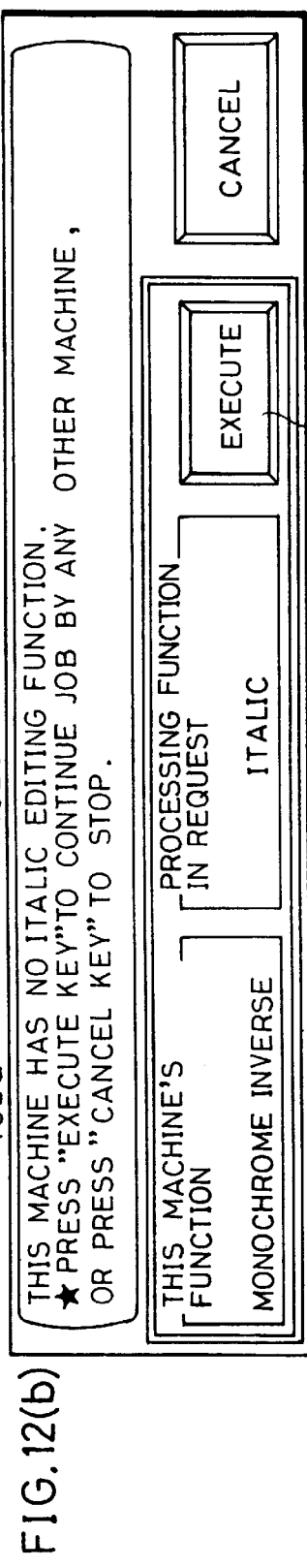
Figure 12C:
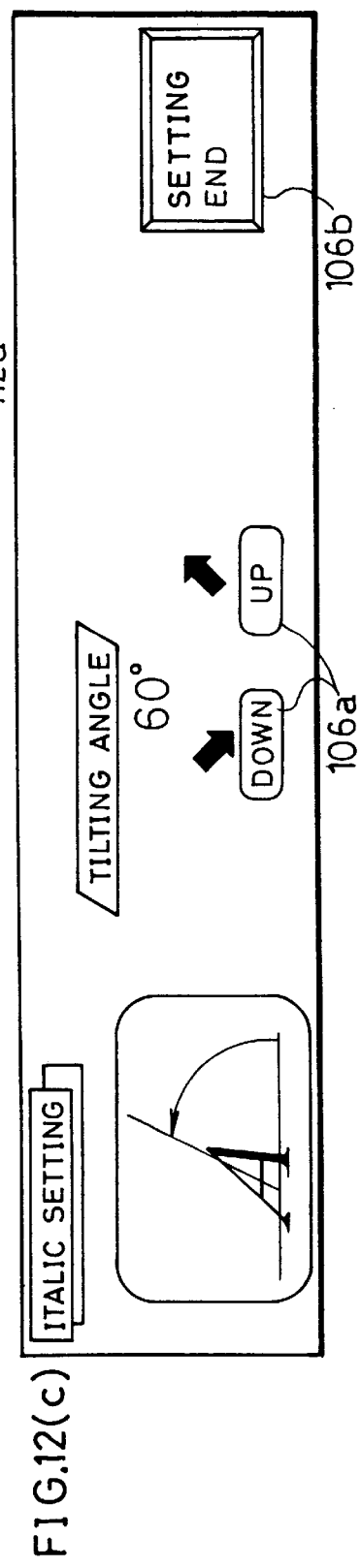
Figure 13:
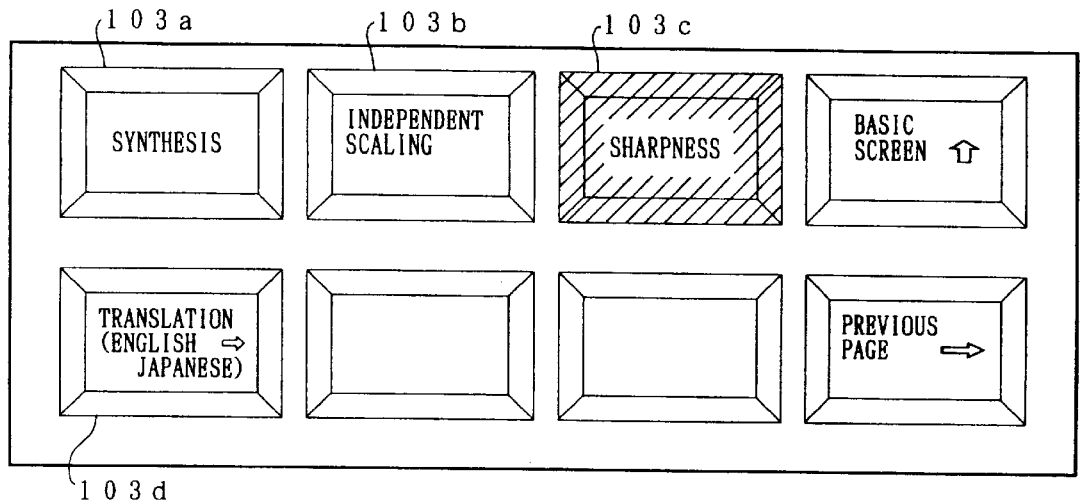
FIG. 13(*a*) is a front view of the second function setting screen of the liquid crystal display device in the control panel of FIG. 6(*c*) when the operator has selected an image edit function he wishes to use.
Figure 13:
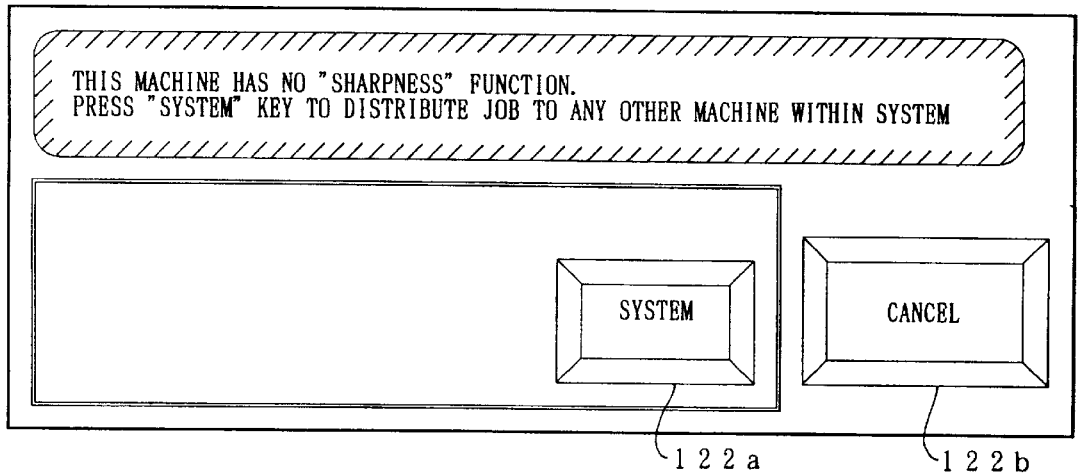
Figure 13:
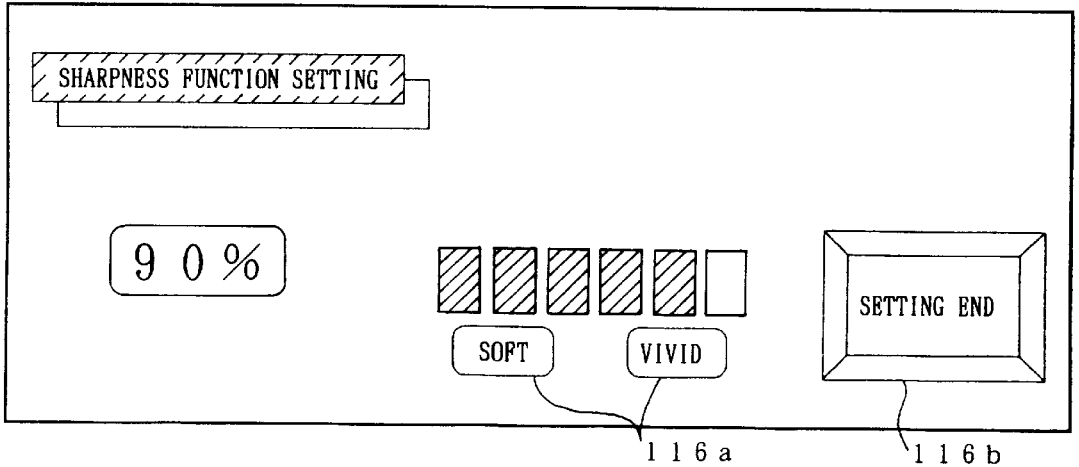

For example, if the operator presses the function setting area, the basic screen switches to the first function setting screen. Further, if the operator presses the control area for advancing to the next page screen, the first function setting screen switches to the second function setting screen (NEXT function setting screen). On the other hand, if the operator presses the control area for returning to the basic screen, the first function setting screen returns to the basic screen. If the operator presses the italic function setting area and inverse function setting area on the first function setting screen, both the italic function setting area and inverse function setting area are displayed with a reversed background as shown in FIG. 12(a), and the first function setting screen switches to the one illustrated in FIG. 12(b). When the operator presses an execute key 112a on the screen of FIG. 12(b), the screen of FIG. 12(b) switches to the italic setting screen illustrated in FIG. 12(c). The italic setting screen includes a tilting angle input key 106a as a tiling angle setting area, and a setting end key 106b as a setting end input area. Further, the italic setting screen displays an example capital letter A tilted by the set angle.

Note that, as soon as the operator presses any function setting area in the first and second function setting screens, the screen switches to a corresponding parameter setting screen, such as the above italic setting screen.

Here, example image edit functions available in the present image forming system by manipulating the setting areas as explained above and the effect of each are set forth in Table 1 below. Note that, however, the image edit functions are not limited to the examples specified below, and a function for making fair copies of handwritten characters and/or pictures is also a possible option.

TABLE 1

| IMAGE EDIT FUNCTION | EFFECT |
| --- | --- |
| INDEPENDENT SCALING | SET MAGNIFICATION IN LATERAL AND LONGITUDINAL DIRECTIONS INDEPENDENTLY |
| SHARPNESS | ADJUST IMAGE QUALITY OF A COPY |
| BINDING MARGIN | LEAVE AN ARBITRARY BINDING MARGIN |
| FRAME ELIMINATION | ELIMINATE FRAME IN A COPY |
| CENTERING | MAKE A COPY AT THE CENTER OF A SHEET |
| 1-SET-2-COPY | MAKE A COPY OF A BOOK |
| ADDRESSED COPY | SYNTHESIZE AN ADDRESS WITH A COPY |
| MULTI-SHOT | COMBINE MULTIPLE PAGES IN ONE COPY |
| TRIMMING | TRIM OFF A NON-DESIGNATED AREA |
| MASKING | MASK A DESIGNATED AREA |
| MOVE | MOVE AN IMAGE TO AN ARBITRARY POSITION IN A COPY |
| SYNTHESIS | SYNTHESIZE MORE THAN ONE IMAGE |
| MONOCHROMIC INVERSE | REVERSE NEGATIVE/POSITIVE IN A COPY |
| CROSSHATCH/SHADE | CROSSHATCH/SHADE AN IMAGE OR ISOLATE AN IMAGE ON CROSSHATCHED/SHADED BACKGROUND |
| SHADOW | ADD SHADOW TO AN IMAGE |
| OUTLINE | BORDER AN IMAGE |
| ITALIC | TILT AN IMAGE |
| MIRROR IMAGE | REVERSE AN IMAGE AS A MIRROR DOES |
| REPEAT COPY | MAKE MULTI-COPY OF AN IMAGE IN ONE SHEET |
| 2-IN-1-COPY | MAKE ONE COPY OUT OF TWO SHEETS OF DOCUMENT |
| DATED COPY | ADD THE DATE TO A COPY |
| CENTER MARK | ADD A CENTER MARK TO A COPY |
| ENLARGE/DIVIDE OUTPUT | DIVIDE AN ENLARGED COPY INTO A NUMBER OF SHEETS |
| TRANSLATION | TRANSLATE A DOCUMENT |
| HIGH-QUALITY PROCESSING | MAKE A HIGH-QUALITY COPY |

Figure 11:
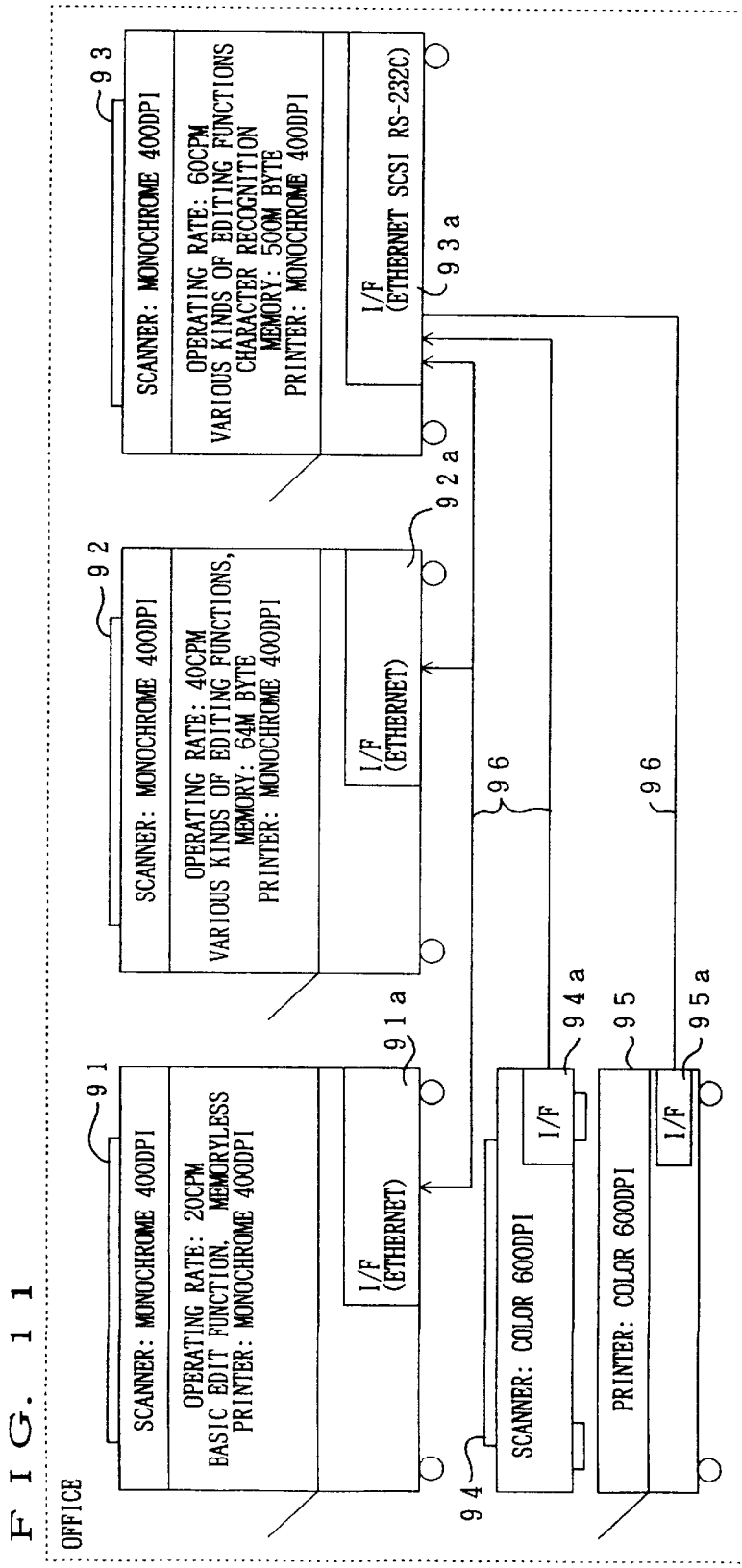
FIG. 11 is a view explaining a schematic structure of the above image forming system.

As shown in FIG. 11, the present image forming system comprises digital data machines installed in a typical office. To be more specific, the present image forming system includes three image forming apparatuses respectively denoted as digital copying machines 91–93, a scanner 94, and a printer 95.

The digital copying machine 91 is an inexpensive, low-grade, "memoryless" model furnished with basic edit functions only. "Memoryless" referred herein means that the machine does not include a page memory capable of storing a great volume of image data, but includes at least a line memory which is sufficient to operate as a normal digital copying machine. Also, the basic edit functions means, for example, the monochromic inverse function that can be carried out without using a page memory. The digital copying machine 91 includes the scanner unit 40 of FIG. 2 with the resolution of 400DPI in monochrome, and has a relatively low operating rate of 20CPM (Copies Per Minute). The laser printer section 32 of the digital copying machine 91 has also a resolution of 400DPI in monochrome, and includes an interface (I/F) 91a.

The digital copying machine 92 is a middle-grade model whose scanner and printer have a resolution of 400DPI in monochrome, respectively, with an operating rate of 40CPM. The digital copying machine 92 includes various kinds of edit functions, 64M-byte memory (capable of storing up to four Japanese Standard A4 size papers at the resolution of 400DPI, 8-bit/pixel), and an interface 92a. The above memory corresponds to the main memory 73a of FIG. 4.

The digital copying machine 93 is a high-grade model whose scanner and printer has a resolution of 400DPI in monochrome, respectively with an operating rate as high as 60CPM.

Further, the digital copying machine 93 includes various kinds of edit functions, a character recognition function, a bit data coding function, and a page memory of a capacity as large as 500M bytes (capable of storing up to 100 pages of Japanese standard A4 size papers at the resolution of 400DPI, 8-bit/pixel at compression ratio of 1/4). Thus, the digital copying machine 93 can change the page order of the input image data, or store the document data in different formats. The above memory corresponds to the main memory 73a and hard disk 73b of FIG. 4 combined. The digital copying machine 93 also includes an interface 93a.

The scanner 94 can read a color image at a resolution of 600DPI. The printer 95 can produce a color image copy at a recording density of 600DPI. The scanner 94 and printer 95 include interfaces 94a and 95a, respectively.

The digital copying machines 91 and 92, scanner 94, and printer 95 are connected to the digital copying machine 93 through their interfaces 91a–95a and transmission lines 96, thereby enabling mutual data transmission. Thus, the interfaces 91a–95a, transmission lines 96, and PCU 74 of each digital copying machine constitute the transmitting apparatus herein.

The transmitting apparatus handles image data like bit data (for example, level data per pixel unit: 8 bits in 256 levels), command data and the like. The transmitting apparatus can transmit a high-level image such as a landscape, at high definition. Also, the transmitting apparatus can reduce a volume of text data, namely, characters data, by coding the read data, thereby enabling high-speed data transmission. In particular, the image data having different levels, for example, those of a landscape, are generally transmitted after reducing its volume by the area leveling methods, such as the Dither method and error diffusing method. In case of the error diffusing method, each digital copying machine processes the image data prior to transmission, and sends the processed image data in an adequate format for any of the digital copying machines 91–93 and printer 95. Thus, when any of the above digital copying machines 91–93 receives the image data, the corresponding machine inputs the received image data into its laser printer unit 32 without converting the data format to convert the same into a writing data array by means of the image processing section and outputs the resulting data.

Each of the interfaces 91a–95a is defined by their own prescribed protocols and transmission rates, and an adequate standard is selected based on the content of the transmission data, such as a data volume, and the position of each machine in relation with the others, such as a distance. Further, in the present image forming system, the machines are connected in one-to-one relationship, while at the same, some of the machines may be connected to the common transmission line 96 like a daisy chain. For this reason, each machine has its address, so that each of the interfaces 91a–95a can identify a particular machine to which the image data are addressed. The interfaces 91a–95a adopt, for example, an Ethernet, for their standard, which are in effect a network permitting high-speed image data transmission. Alternatively, the interfaces 91a–95a may adopt a general standard known as SCSI (Small Computer System Interface) or RS-232C.

Each of the digital copying machines 91–93 includes a facsimile function, so that each can transmit data through a telephone line. Also, each of the digital copying machines 91–93 includes a printer mode, so that each can print out document data sent from a personal computer or word processor.

The functions of the digital copying machine depend on its price, memory capacity, and the like, and every office has different purpose and demand. Thus, the digital copying machines are not limited to the above example digital copying machines 91–93, and a great line-up of models are available.

Here, example image edit functions of the above digital copying machines 91–93 of the present embodiment are tabulated for ready comparison in Table 2 below.

TABLE 2

| IMAGE EDIT FUNCTION | MACHINE 91 | MACHINE 92 | MACHINE 93 |
|---|---|---|---|
| INDEPENDENT SCALING | ○ | ○ | ○ |
| SHARPNESS |  | ○ | ○ |
| BINDING MARGIN | ○ | ○ | ○ |
| FRAME ELIMINATION | ○ | ○ | ○ |
| CENTERING |  | ○ | ○ |
| 1-SET-2-COPY |  | ○ | ○ |
| ADDRESSED COPY |  |  | ○ |
| MULTI-SHOT |  | ○ | ○ |
| TRIMMING-MASKING |  | ○ | ○ |
| MOVE |  | ○ | ○ |
| SYNTHESIS |  |  | ○ |
| MONOCHROMIC INVERSE | ○ | ○ | ○ |
| CROSSHATCH/SHADE |  |  |  |
| SHADOW-OUTLINE |  |  | ○ |
| ITALIC-MIRROR IMAGE |  |  | ○ |
| REPEAT COPY | ○ | ○ | ○ |
| 2-IN-1-COPY |  |  | ○ |
| DATED COPY-CENTER MARK |  |  | ○ |
| ENLARGE/DIVIDE OUTPUT |  |  |  |
| TRANSLATION |  |  |  |
| HIGH QUALITY PROCESSING |  |  |  |

The data related to these functions are stored in the memory 73 of each of the digital copying machines 91–93, and the PCU 74 of each machine refers these data when necessary.

In the present image forming system, the digital copying machine 93 having the greatest number of image processing functions and largest memory capacity is used as a second image forming apparatus, to which the other two digital copying machines 91 and 92, scanner 94, and printer 95 are connected as shown in FIG. 11. This arrangement enables the copying machines 91 and 92 to use the image processing functions and memory 73 of the digital copying machine 93. In case that the operator, manipulating the copying machine 91 or 92, wishes to use an image processing function provided only to the digital copying machine 93, the digital copying machine 91 or 92 sends the image data to the digital copying machine 93. Then, the digital copying machine 93 processes the received image data in a requested manner, and returns the processed image data to the digital copying machine 91 or 92, whichever that has sent the original image data. Subsequently, the digital copying machine 91 or 92 outputs the returned image data in the form of an image on a sheet. In case that the digital copying machine 91 or 92 uses the memory 73 of the digital copying machine 93, the digital copying machine 91 or 92 sends the image data to the digital copying machine 93. Then, the digital copying machine 93 stores the received image data into its memory 73, and returns the same, when occasion demands, to either the digital copying machine 91 or 92, whichever that has sent the original image data.

The image processing operation of the image forming system arranged as above will be detailed with reference to the flowchart of FIG. 15. Assume that the operator, manipulating the digital copying machine 91, selects the sharpness function to highlight an image in every certain number of pages, and the image data are distributed to the digital copying machines 92 and 93 for parallel processing herein. Note that the function setting screen of the liquid crystal display device 1 of the digital copying machine 91 displays the functions provided to the digital copying machines 92 and 93 as well. Also, note that the operation of each digital copying machine is controlled by its own PCU 74 unless otherwise specified.

To begin with, as soon as the operator presses the function setting key 101a in the basic screen of the liquid crystal display device 1 of FIG. 6(a), the screen switches to the first function setting screen of FIG. 6(b). Then, the screen switches to the second function setting screen of FIG. 6(c) when the operator presses the next page key. To select the sharpness function, the operator presses the sharpness key 103a in the second function setting screen (S1), then the sharpness function setting area is displayed with a reversed background as shown in FIG. 13(a), which enables the operator to confirm that he has selected the sharpness function.

Next, the PCU 74 of the digital copying machine 91 selects the digital copying machine(s) having the sharpness function within the image forming system, and at the same time, compares the digital copying machines 91–93 in image processing performance (S2).

Then, the PCU 74 checks whether or not the sharpness function is provided to its own digital copying machine 91 (S3). Since Table 2 above reveals that the digital copying machine 91 does not have the sharpness function, the checking result is negative in S3. Accordingly, the PCU 74 displays the message "THIS MACHINE HAS NO SHARPNESS FUNCTION" on the liquid crystal display device 1, and directs the operator to select whether the job should be carried out by any other eligible device within the system or not (S4). The display of the screen at this point is illustrated in FIG. 13(b).

As has been described above, since the digital copying machine 91 does not have the sharpness function, if the operator wishes to continue the job, the digital copying machine 91 has to request another machine to carry out the sharpness function on its behalf. Herein, the digital copying machine 91 is arranged to confirm the operator's instruction by displaying the screen of FIG. 13(b). However, if the operator wishes to stop the job, he presses a cancel key 122b (S5), upon which the PCU 74 cancels the set mode (S6).

On the other hand, when the operator presses a system selection key 122a (S5), the PCU 74 selects the digital copying machines 92 and 93 as the devices having the sharpness function within the system. Also, the screen of the liquid crystal display device 1 switches to the sharpness function setting screen of FIG. 13(c).

Next, the operator inputs the desired highlighting level in sharpness using a sharpness input key 116a, and presses a setting end key 116b, upon which the digital copying machine 91 determines, to which of the selected digital copying machines it should issue a job request to process the document data (S7). Herein, as previously mentioned, both the digital copying machines 92 and 93 are selected, and the detailed explanation as to how digital copying machine 91 determines the most eligible digital copying machine will be given below. Next, the digital copying machine 91 gives function control data to each image, and transfers the same to the digital copying machines 92 and 93 after scrambling the data, which also will be described below (S8).

The above image data are transmitted from the main memory 73a of FIG. 4 of the digital copying machine 91 to both the digital copying machines 92 and 93 through the image data transmission unit 81 and an unillustrated modem. The image data are transmitted together with the function control data composed of a processing code indicating the requested function, namely, the sharpness function herein. As shown in FIG. 11, the transmitted image data are inputted into the digital copying machines 92 and 93 through the interface 91a, transmission lines 96, and interface 92a and 93a, respectively.

The image data processed herein are the data of the original image read by, for example, the scanner section 31. As previously mentioned, the digital copying machine 91 does not include the page memory but the line memory alone. Therefore, the image data are read and transferred steadily per line.

In case that the image data are transferred through a general network, the image data may leak to an external to the network. Thus, if the document contains confidential information, it is strongly recommended to transmit the image data thereof with great care to prevent the leakage.

However, since anyone can access the general network at any time, an authorized third party, or a so-called hacker, can easily access the image data flowing through the network. Therefore, it is preferable to have a preventive measure, such as scrambling the image data subject to transmission through the network, so that should the third party obtain the image data, he can not make any sense out of them. In the present embodiment, the image data are scrambled prior to transmission for protection.

Upon receipt of the scrambled image data, the digital copying machines 92 and 93 lift the scramble protection thereof, and confirm the same as being the image data and function control data specifying the requested function. Accordingly, the digital copying machines 92 and 93 start to process the received image data using the sharpness function as was requested (S9).

Neither of the digital copying machines 92 and 93 returns the processed image data to the digital copying machine 91 as soon as they end the job. They withhold the processed image data until the digital copying machine 91 empties its own memory 73, in other words, until the digital copying machine 91 issues a return request for the processed image data (S10).

This is because, as previously mentioned, the digital copying machine 91 does not have a memory of a sufficient capacity to store the processed image data if they are returned immediately.

Upon receipt of the return request from the digital copying machine 91 in S10, the digital copying machines 92 and 93 scramble the processed image data and return the same to the digital copying machine 91 in a direction reverse to the previous inbound transmission (S11).

Then, the digital copying machine 91 lifts the scramble protection of the received image data (S12), which are steadily supplied to the laser printer section 32 and outputted in the form of an image onto a sheet (S13). The recording operation is carried out in the same manner as was explained with the digital copying machine 30 above.

Figure 14:
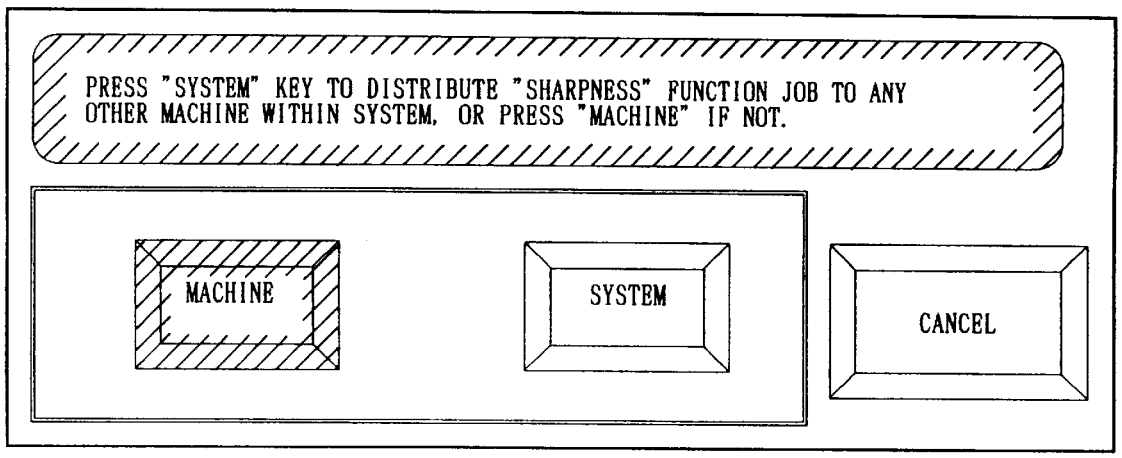
FIG. 14 is a front view showing the above liquid crystal display device in the control panel when S14 of FIG. 15 is being carried out.

On the other hand, in case that the checking result is positive in S3, in other words, the digital copying machine that the operator is manipulating has the sharpness function, a message is displayed on the liquid crystal display device 1 as shown in FIG. 14. In addition, the digital copying machine directs the operator to decide whether he also wishes to use any other eligible digital copying machine within the system by displaying a corresponding message on the liquid crystal display device 1 (S14).

A good example of the above would be a case where the operator, manipulating the digital copying machine 92, wishes to use the sharpness function by using the data processing portions 71 of both the digital copying machines 92 and 93.

Suppose again that the operator wishes to take the advantages of the present image forming system, in other words, he wishes to process the image data using the digital copying machine 93 as well (S15). Then, the digital copying machine 92 proceeds to S7, and selects any other eligible digital copying machine (herein machine 93) besides the self, and sends a part of the image data to the digital copying machine 93 thus selected, so that the digital copying machine 93 proceeds to S8 and beyond. At the same time, the digital copying machine 92 carries out the sharpness function on the rest of the image data. Note that the digital copying machine 92 may request the digital copying machine 93 to process all the image data on its behalf.

On the other hand, if the operator wishes to process the image data using the digital copying machine 92 alone, the digital copying machine 92 carries out the sharpness function on the image data (S16), and proceeds to S13 to output the processed image data.

As has been explained, in the present image forming system, if the operator, manipulating the digital copying machine 91, wishes to use an edit function which is not provided therein, the digital copying machine 91 requests both the digital copying machines 92 and 93 or either of them to process the image data on its behalf. Therefore, the digital copying machine 91 does not have to be a high-grade model like the digital copying machine 92 or 93 furnished with various kinds of edit functions.

Figure 15:
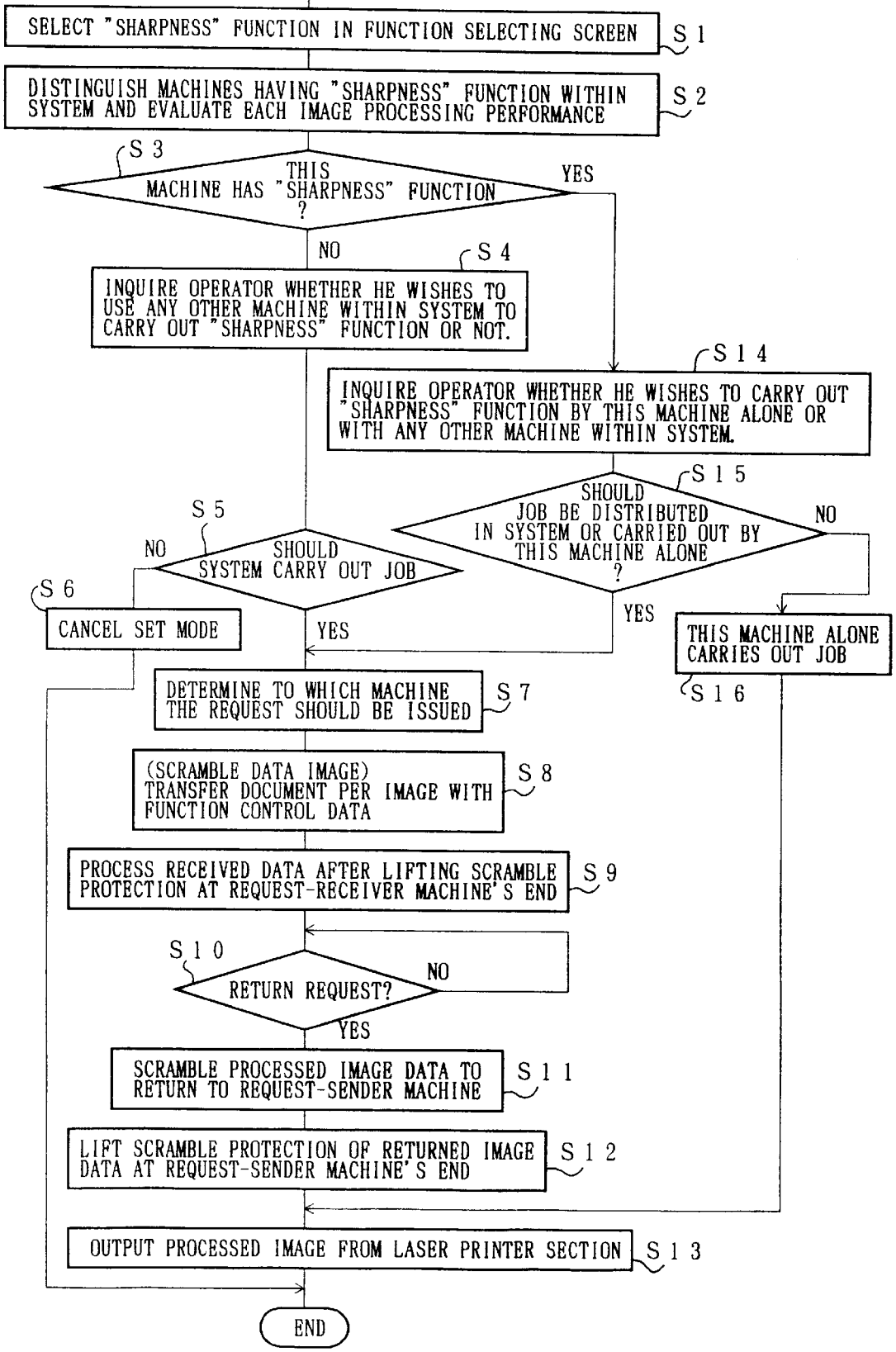
FIG. 15 is a flowchart detailing an operation of the image forming system of FIG. 11 when a first image forming apparatus requests a second digital copying machine to carry out image processing on its behalf.
Figure 16:
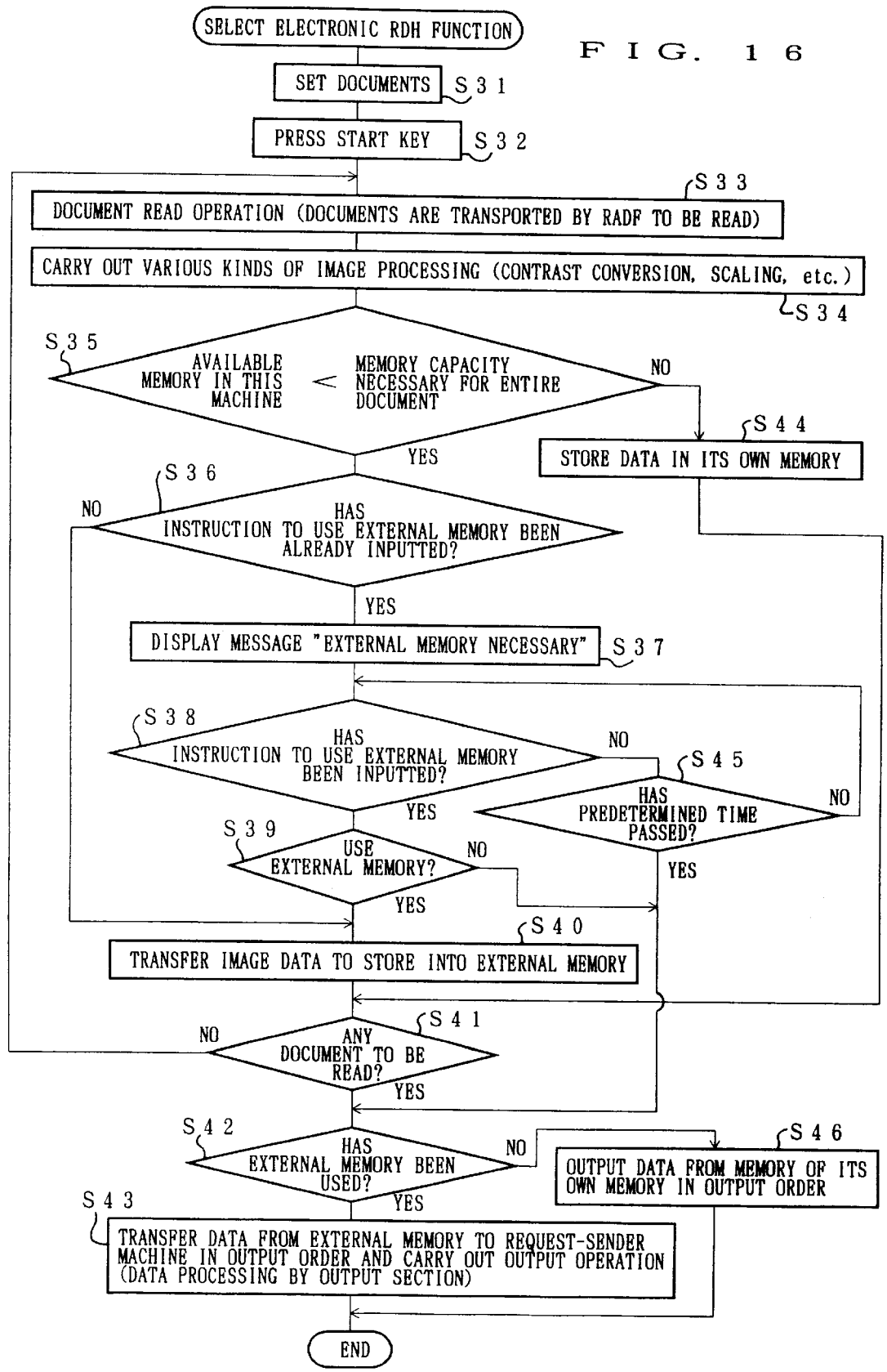
FIG. 16 is a flowchart detailing an operation of the image forming system of FIG. 11 when the first image forming apparatus issues a store request to the second image forming apparatus to store the image data on its behalf.

In the example of FIG. 15, the digital copying machines 92 and 93 return the processed image data to the digital copying machine 91 at its return request to enable the same to output a copy image in S11. However, a digital copying machine or printer may be selected under various conditions, so that the processed image data are sent to the selected device and outputted therefrom.

In the above explanation, only the digital copying machines 91–93 are concerned. However, if the scanner 94 and printer 95 are combined, they can operate in almost the same manner as a digital copying machine and can be used as such. In this case, color image data read by the scanner 94 with a resolution of 600DPI are sent to the digital copying machine 93 to be processed. Then, the digital copying machine 93 returns the processed image data with a recording resolution of 600DPI to the printer 95 to be printed out therefrom. Thus, the scanner 94 and printer 95, when combined, can operate almost in the same manner as the above digital copying machines.

The present image forming system is arranged in such a manner that the digital copying machines 91 and/or 92 can use the memory 73 of the digital copying machine 93, which will be explained using example transmission where the digital copying machine 92, serving as the first image forming apparatus that issues a job request, and the digital copying machine 93, serving as the second image forming apparatus that receives the job request. Herein, the digital copying machine 92 includes the electronic RDH function, and the job request referred herein is a request to store the image data on behalf of the digital copying machine 92, which is referred to as a store request hereinafter.

By the electronic RDH function, all the image data of a 10-page original document are stored in the memory 73, and retrieved repetitively per page to make, for example, 20 copies. The operator can select the electronic RDH function by pressing the function set key 101*a* of FIG. 6(*a*). As soon as the function set key 101*a* is pressed, an electronic RDH function setting key is displayed on the second function setting screen of FIG. 6(*c*).

The digital copying machine 92 includes a 64M-byte page memory as the memory 73. Thus, the memory 73 can store 256-level image data of up to four Japanese Standard A4 size papers. This is sufficient for an ordinary copying operation where a copy of the original document is made after the image data thereof are stored. However, in case that the operator wishes to make several copies of a 10-page document using the electronic RDH function, the image data of 6 pages exceeds the capacity of the memory 73. Thus, in this case, the electronic RDH function is carried out using the memory 73 serving as the storage means of the digital copying machine 93, which will be explained with reference to the flowchart of FIG. 16.

To begin with, the operator selects the electronic RDH function in the digital copying machine 92, and sets a 10-page document on the RADF 36 of FIG. 2 (S31). Then, as soon as the operator presses the start key 15 of FIG. 5 (S32), the steady document transportation from the RADF 36 starts and an image on each page of the documents is successively read by the scanner unit 40. The image data thus produced are steadily accumulated in the memory 73 of the digital copying machine 92 (S33). Also, the above image data are subject to processing by the image data processing section 71, such as the contrast conversion and scaling (S34). When the operator presses the electronic RDH function set key, an external memory selection key 121*a* is displayed on the liquid crystal display device 1 together with an available memory indicating section 121*b* as shown in FIG. 17(*a*).

While the scanner unit 40 is reading the document, if an available capacity of the memory 73 becomes insufficient to store the image data of the rest of the document (S35), and if the operator has not pressed the external memory selection key 121*a* in advance (S36), the liquid crystal display device 1 displays a message warning that an external memory is necessary as is shown in FIG. 17(*a*) (S37).

As soon as the operator presses the external memory selection key 121a (S38), the screen switches to the one displaying a message as shown in FIG. 17(b). On the switched screen, the external memory selection key 121a is displayed with a reversed background to indicate that the same has been pressed, while the available memory indicating section 121b indicates a total of the available capacities of the memories 73 in both the digital copying machines 92 and 93.

Next, when the operator presses the continue key 121c by following the message displayed on the screen of FIG. 17(b) (S39), the digital copying machine 92 starts to transfer the image data to the digital copying machine 93 to store the same in the memory 73 thereof serving as an external memory (S40).

Then, the screen of the liquid crystal display device 1 switches to the one shown in FIG. 17(c). Note that the image data transferred to the digital copying machine 93 are either the image data being read by the scanner unit 40 or the image data stored in the memory 73 of the digital copying machine 92. Also, the image data are transferred in the same manner as directly sending the image data explained above. Accordingly, the digital copying machine 93 receives the transferred image data and stores the same in its own memory 73.

The digital copying machine 92 carries out S33–S40 repetitively until the entire document is read (S41). When the document reading ends, and in case that the external memory is used (S42), the digital copying machine 93 returns the image data to the digital copying machine 92 in the output order, so that the digital copying machine 92 can steadily output the returned image data in the form of an image on a sheet (S43). Herein, the output order is a descending order in page numbers.

The image data are retrieved from each memory 73 in the same manner as the writing operation. To be more specific, the image data are retrieved from the memory 73 of the digital copying machine 92 through a data line within the digital copying machine 92, whereas the image data are retrieved from the memory 73 of the digital copying machine 93 through the transmission line 96.

On the other hand, if an available capacity of the memory 73 of the digital copying machine 92 is sufficient to store the image data of the rest of the document in S35, the digital copying machine 92 continues to store the image data into its own memory 73 (S44), and proceeds to S41. Subsequently, the digital copying machine 92 carries out S41 and S42, and steadily outputs the image data stored in its own memory 73 onto a sheet in an output order (S46).

When a predetermined time limit has passed before the operator presses the external memory selection key 121a in S38 (S45), the digital copying machine 92 proceeds to S42 and steadily outputs the image data stored in its own memory 73 up to that point onto a sheet in an output order (S46).

In the above explanation, the digital copying machine 92 is arranged to store the image data into its own memory 73 to its full capacity; however, some pages of which may be secured as an operation area used exclusively for its control operation.

Further, the present image forming system is arranged in such a manner that, when the digital copying machine 93 receives a job request of an edit function which is not provided therein, or a store request in a volume exceeding an available capacity of its memory 73 from any other digital copying machine, a message that the digital copying machine 93 can not accept the job request will be displayed on the liquid crystal display device 1 of the digital copying machine that has sent the job request. In short, every time the digital copying machine 93 receives a job request, it checks the content of the same by means of the PCU 74.

When the digital copying machine 93 can carry out the requested job, it does so simply; otherwise, the digital copying machine 93 transmits data indicating that it can not carry out the requested job to the request-sender digital copying machine. Upon receipt of such data, the request-sender digital copying machine displays a corresponding message on its liquid crystal display device 1.

Described in the following is a method of deleting the storage content which have been stored in the memory 73, serving as the storage means of the digital copying machine 93, at the request from and on behalf of the digital copying machine 92, serving as the first image forming apparatus.

The present image forming system is arranged in such a manner that if the digital copying machine 93 does not receive a return request from the digital copying machine 92 within a predetermined period, the digital copying machine 93 automatically erases the image data and appended data which have been stored in its own memory 73 on behalf of the digital copying machine 92 at its request to reduce the capacitive burden of the memory 73.

In other words, the present image forming system is arranged in such a manner that the digital copying machine 93 erases the image data if it has not received the return request from the request-sender digital copying machine (herein machine 92) for a considerable period, thereby preventing its own memory 73 from accumulating the image data unnecessarily. This arrangement makes it possible to prevent the memory 73 being occupied unnecessary to reduce the burden in a copying operation of its own digital copying machine 93.

The above image data erasing operation will be explained with reference to the flowchart of FIG. 1.

Assume again that the digital copying machine 92 needs the memory 73 of the digital copying machine 93 as the external memory to carry out the job.

As previously explained, the digital copying machine 92 includes the 64 M-byte page memory as the memory 73, into which 256-level image data of up to four Japanese Standard A4 size papers can be stored.

A 64 M-byte memory is sufficient for an ordinary copying operation where a copy of the document is made after the image data thereof are stored. However, in case that the operator wishes to make several copies of a 10-page document using the electronic RDH function, the image data of 6 pages exceeds the capacity of the memory 73.

Herein, the image data being read are steadily accumulated in the memory 73 of the digital copying machine 92 to its full, and when the memory 73 becomes full, a message is displayed on the screen as shown in FIG. 17(a) to so inform the operator.

The operator determines whether he wishes to use the external memory or not, and if he wishes so, he presses the external memory key 121a to input an external memory job command. Accordingly, the screen of the liquid crystal display device 1 switches to the one with a message as shown in FIG. 17(b).

As soon as the operator presses the continue key 121c in the switched screen, the screen again switches to the one as shown in FIG. 17(c) to indicate that the digital copying machine 92 is now carrying out the job using the external memory.

Also, as soon as the operator presses the continue key 121c, the digital copying machine 92 starts to transfer the image data of the document to the digital copying machine 93 through the transmitting apparatus.

Figure 1:
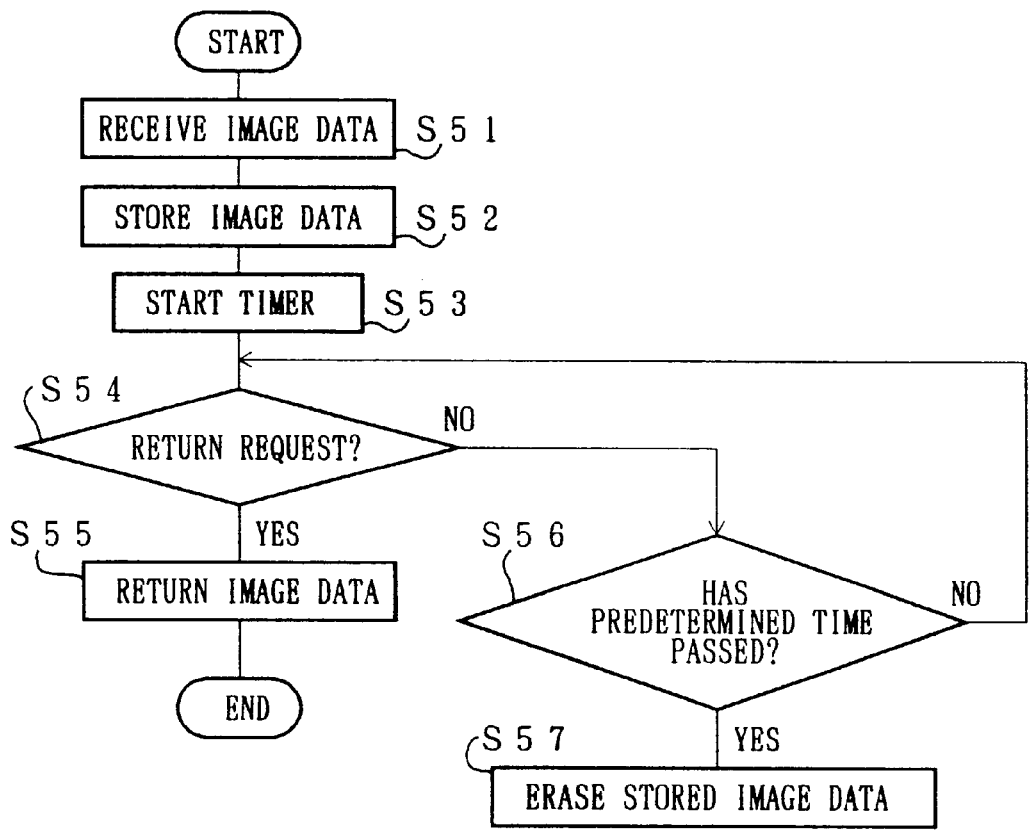
FIG. 1 is a flowchart detailing an operation of an image forming system in accordance with an example embodiment of the present invention.

As is detailed by the flowchart in FIG. 1, the digital copying machine 93 receives the transferred image data of the document (S51), and steadily stores the same into its own memory 73 (S52).

Consequently, the image data of six pages of the document are temporarily stored in the memory 73 of the digital copying machine 93. Note that the memory 73 is managed in the environments that disallow any data loss. To be more specific, the above memory 73 is composed of a non-volatile memory, such as a memory with a back-up power source and a flash memory, so that it does not lose the image data once they are stored therein, should a power supply to the main body of the digital copying machine 93 accidentally stop.

When the document reading ends, the digital copying machine 92 retrieves the image data stored in its own memory 73 to output the same to produce a printed record through the laser printer section 32 in a descending order in page numbers, after which the digital copying machine 92 sends a return request to the digital copying machine 93 (S54). Upon receipt of the return request, the digital copying machine 93 retrieves the image data from its own memory 73 and returns the same to the digital copying machine 92 (S55). Then, the digital copying machine 92 outputs the returned image data and produce a printed record in the same manner as above. More specifically, the image data retrieved from the memory 73 of the digital copying machine 93 are sent through the transmitting apparatus within the image forming system in the same manner as the image data writing operation. In short, the image data are steadily retrieved per page and returned to the digital copying machine 92 to produce a printed record of the same.

The digital copying machine 93 sets a timer serving as time measuring means when its own memory 73 started to store the image data from the digital copying machine 92 in S52 to manage a time interval (S53). When a predetermined time has passed (S56), the digital copying machine 93 erases the image data stored in its own memory 73 on behalf of the digital copying machine 92 (S57). This arrangement prevents the memory 73 of the digital copying machine 93 from storing the same image data for a considerable period.

The time interval can be set arbitrary depending on the structure of the image forming system. For example, if the image forming system comprises high-speed digital copying machines, the time interval can be short. On the other hand, if the image forming system comprises low-speed digital copying machines, the time interval may be longer. This arrangement disallows the memory 73 to erase valid image data together with invalid image data.

As has been explained, the present image forming system is arranged in such a manner that when the memory 73 of the digital copying machine 92 is insufficient to carry out the electronic RDH function, the operator can input a command to send a job request to the digital copying machine 93 to use its memory 73 by manipulating the control panel 90 serving as command input means. When the operator inputs a command to issue the job request to use the memory 73 of the digital copying machine 93 through the control panel 90 of the digital copying machine 92, the PCU 74 of the digital copying machine 92 transfers the image data that have been stored in its own memory 73 to the digital copying machine 93 at the job request. The image data are transferred either partially or entirely.

Upon receipt of the image data through the transmitting apparatus, the digital copying machine 93 stores the same into its own memory 73 serving as the storage means. The digital copying machine 93 waits for a return request from the digital copying machine 92, and upon receipt of the same, it returns the image data to the digital copying machine 92 through the transmitting apparatus.

Accordingly, the digital copying machine 92 stores the returned image data into its own memory 73 first, and thence retrieves the stored image data and inputs the same into the laser printer section 32. Consequently, the digital copying machine 92 outputs the input image data to produce a printed record in the form of a visible image by means of the laser printer section 32 under the control of the PCU 74.

According to the above arrangement, the operator can carry out a job that demands a memory of a great capacity even when the digital copying machine 92 he is manipulating has the memory 73 with an insufficient capacity, because the digital copying machine 92 can use the memory 73 of the digital copying machine 93.

On the other hand, the PCU 74 of the digital copying machine 93 serving as erasing means erases the image data in its own memory 73 if no return request is sent from the digital copying machine 92 within a predetermined time interval measured by the timer.

In other words, when the digital copying machine 92, which has issued a job request to the digital copying machine 93 to store the image data on its behalf, has not had any contact for a considerable period, the image data stored in the memory 73 of the digital copying machine 93 are erased to reduce the burden thereof, thereby making it possible to utilize the memory 73 of the digital copying machine 93 to its full capacity. In other words, the digital copying machine 93 is arranged not only to accumulate the image data on behalf of any other digital copying machine at its request, but also to erase the image data thus accumulated when the accumulated image data become a considerable burden on its operation after judging the validity thereof. This arrangement makes it possible to prevent the memory 73 from being occupied by invalid image data for a considerable period to reduce the burden of the digital copying machine 93 in its own copying operation. Consequently, the present image forming system as a whole can always handle a great volume of image data efficiently in an optimal condition.

Since the time interval can be set arbitrary in the timer, invalid image data are erased based on an adequate time interval in the entire image forming system, whether the image forming system is composed of high-speed or low-speed machines. In other words, a long time interval is given to the low-speed machines, so that the request-receiving digital copying machine will not erase the transmitted image data without giving an ample time for a low-speed request-sending digital copying machine to issue a return request.

Since the above memory 73 of the digital copying machine 93, where the image data from the digital copying machine 92 are stored temporarily, is composed of a non-volatile memory, such as a memory with a back-up power source and a flash memory, it does not lose the image data, should a main power supply to the digital copying machine main body accidentally stop. This arrangement ensures the memory 73 of the digital copying machine 93 not to lose the image data transferred from any other copying machine with a store request, thereby eliminating unwanted job to ask the request-sender copying machines to send the job request again due to accidental data loss.

(Embodiment 2)

Figure 19:
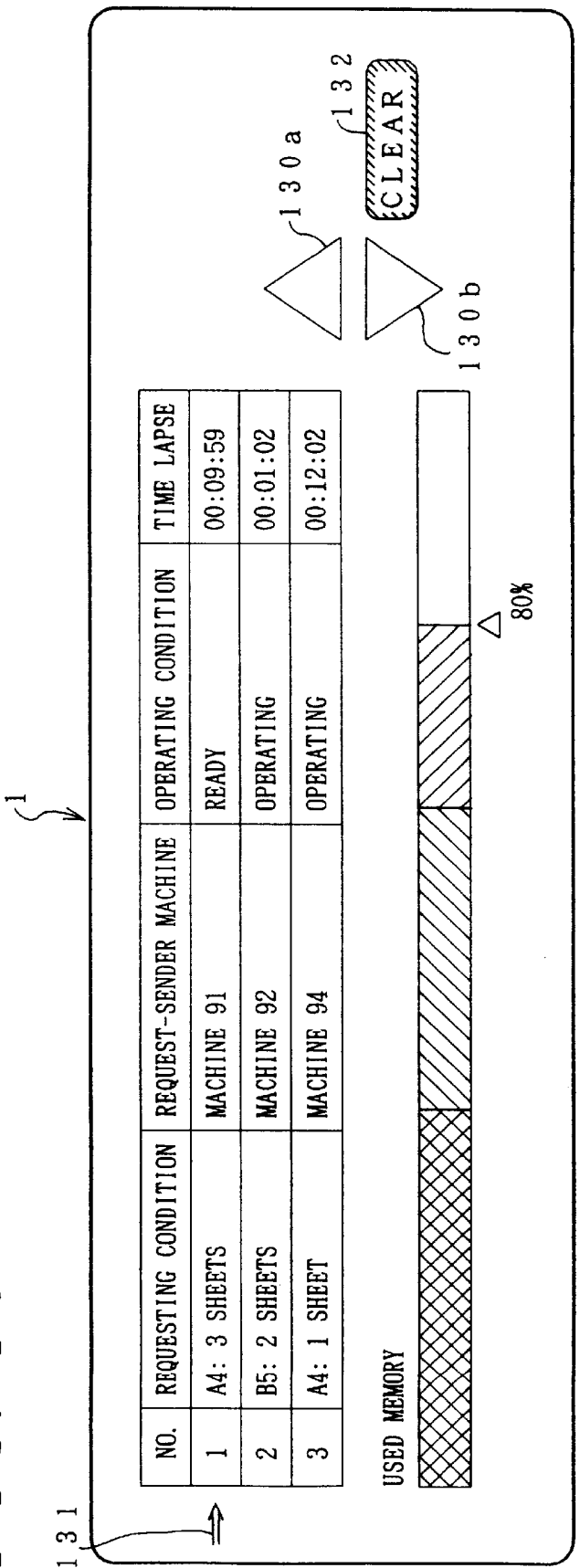
FIG. 19 is a front view showing the above liquid crystal display device in the control panel when S69 of FIG. 18 is being carried out.

Referring to FIGS. 18 and 19, the following description will describe another example embodiment of the present invention. Hereinafter, like components are labeled with like reference numerals with respect to the Embodiment 1, and the description of these components is not repeated for the explanation's convenience.

In the image forming system of Embodiment 1, the image data are automatically erased from the memory 73 when the predetermined time has passed in S56 of the flowchart of FIG. 1 (S57). However, this may be modified. For example, before the image data are erased from the memory 73, the operating condition of the machine that has sent the store request, namely the digital copying machine 92 herein, may be checked when the predetermined time has passed. Then, whether the image data should be erased or not is determined based on the confirmed operating conditions.

For example, as shown in FIG. 18, after the digital copying machine 93 receives the image data and appended data, such as its machine ID (identification) No., from the digital copying machine 92 (S61), the digital copying machine 93 stores the received image data and appended data into its memory 73 (S62). Also, the image digital copying machine 93 sets a timer when the image data and appended data are started being stored (S63). Assume a timer is set for 10 minutes herein.

Subsequently, the digital copying machine 93 waits for a return request from the digital copying machine 92 (S64), and upon receipt of the return request, returns the image data to the digital copying machine 92 (S65), after which the digital copying machine 92 resets the timer (S66).

On the other hand, if there is no return request from the digital copying machine 92 in S64, whether the predetermine time, 10 minutes, has passed or not is checked (S67). When 10 minuets have passed, the digital copying machine 93 resets the timer (S68), and confirms the operating condition of the request-sender digital copying machine 92 through the transmitting apparatus (S69).

Next, if the request-sender digital copying machine 92 is in operation (S70), the digital copying machine 93 sets the timer again (S71) because the digital copying machine 92 may send the return request after it ends the current operation. Then, the digital copying machine 93 returns to S64 and waits for the return request again. As previously mentioned, the time interval set for the timer in S71 is determined based on the performance level of each digital copying machine within the image forming system. As the time interval is set for 10 minutes in S63, the time interval is set, for example, 5 minutes, in S71.

If the digital copying machine 92 is not in operation in S70, the digital copying machine 93 erases the image data stored in its own memory 73 on behalf of the digital copying machine 92 (S72).

Further, if the time has not been up yet in S67, the digital copying machine 93 returns to S64 and waits for the return request.

In the present image forming system, the image data in the memory 73 are automatically erased in S70 and S72. However, as shown in FIG. 19, it can be modified in such a manner that the operator can manually erase the image data. To be more specific, the liquid crystal display device 1 on the control panel 90 of the digital copying machine 93 may be arranged to display the operating condition of the request-sender digital copying machine 92, so that the operator can confirm the operating condition of the digital copying machine 92 and erase the image data manually using the display.

As shown in the drawing, the screen displays a table, which contains: "No." indicating serial numbers of the requests; "request condition" indicating the content of the store request, namely, the size and quantity of the document; "request-sender machine" identifying the digital copying machine that has sent the store request; "operating condition" indicating whether the request-sender machine is in operation or a ready state; and "time lapse" indicating a lapse of time since the transferred image data are stored in the memory 73.

In addition, the state and available capacity of the memory 73 are displayed below the above display areas, so that the operator can confirm the availability of the same. Further, an up key 130a and a down key 130b are displayed at the right side of the screen to enable the operator to move a cursor displayed in the left side of the table vertically. Thus, the operator moves the cursor next to the serial No. of the image data he wishes to erase and presses a clear key 132. Then, the corresponding image data are erased from the memory 73.

According to the above arrangement, the operator can check the operating condition of the request-sender digital copying machine 92. Thus, if the request-sender digital copying machine 92 is in a ready state, the same is judged to have finished the copying job for the image data of a document in question. Also, if the power supply to the request-sender digital copying machine 92 is turned off, the same is practically reset. Thus, the digital copying machine 93 can erase the image data stored in its own memory 73 under these conditions, either automatically or by the operator's manual operation.

As has been explained, in the present image forming system, the digital copying machine 93 does not return the image data to the digital copying machine 92 unless the return request is received. Thus, if the operating condition of the digital copying machine 92 were undetectable, the digital copying machine 93 could not erase the image data from its memory 73 even when the return request has not been received for a considerable period and storing such image data is becoming a burden for its operation.

Therefore, to eliminate this problem, the PCU 74 of the digital copying machine 93 serves as condition confirming means for confirming the operating conditions of the digital copying machine 92, such as "in operation", "ready", "power off", etc. Consequently, the digital copying machine 93 can confirm the operating condition of the digital copying machine 92 through signal transmission by means of the PCU 74.

For example, in case of "in operation", the digital copying machine 92 is highly likely to issue the return request in the meantime, and in case of "ready" or "power off" when the return request has not been issued yet, the stored image data in question can be judged as being invalid.

Thus, if the digital copying machine 93 has not received the return request for a considerable period, it confirms the operating condition of the digital copying machine 92.

To reduce the capacitive burden of the memory 73 of the digital copying machine 93, the digital copying machine 93 can automatically erase the stored image data upon confirming "ready" or "power off" state.

Conversely, it has become possible to prevent the erroneous erasing of the image data that should be stored by confirming the operating condition of the digital copying machine 92 before erasing the image data stored in the memory 73 of the digital copying machine 93 on its behalf.

In the present image forming system, the PCU 74 of the digital copying machine 93 serving as the condition confirming means confirms the operating condition of the digital copying machine 92 in the above manner and displays the same in messages, "IN OPERATION", "READY", or "POWER OFF", on the liquid crystal display device 1 which also serves as the condition confirming means.

This arrangement enables the operator using the digital copying machine 93 to erase the image data in its own memory 73 by confirming the operating condition of the digital copying machine 92 displayed on the screen.

Also, in the present image forming system, the image data from the digital copying machine 92 are stored temporarily in the memory 73 of the digital copying machine 93 with appended data, such as a machine ID No. of the request-sender machine. Further, it can be modified in such a manner that appended data are displayed on the liquid crystal display device 1 serving as a display device together with the operating condition.

The above arrangement makes it possible to confirm which digital copying machine has issued which store request when more than one store request is issued. Thus, before erasing the image data that have been left for a considerable period or seem invalid, the digital copying machine 93 identifies the request-sender digital copying machine of such image data based on the machine ID No.

The machine ID No. is used as the appended data of the image data herein; however, data related to the time when the image data are transferred to the digital copying machine 93 from the digital copying machine 92 may be used as the appended data. In this case, for how long the image data are stored in the memory 73 of the digital copying machine 93 can be confirmed more accurately.

In addition, when the memory 73 of the digital copying machine 93 stores the image data on behalf of more than one first image forming apparatus, it is arranged in such a manner that the image data can be erased separately for each first image forming apparatus.

Thus, of all the image data stored on behalf of the first image forming apparatuses, only the invalid image data can be erased selectively from the memory 73 of the digital copying machine 93.

(Embodiment 3)

Figure 20:
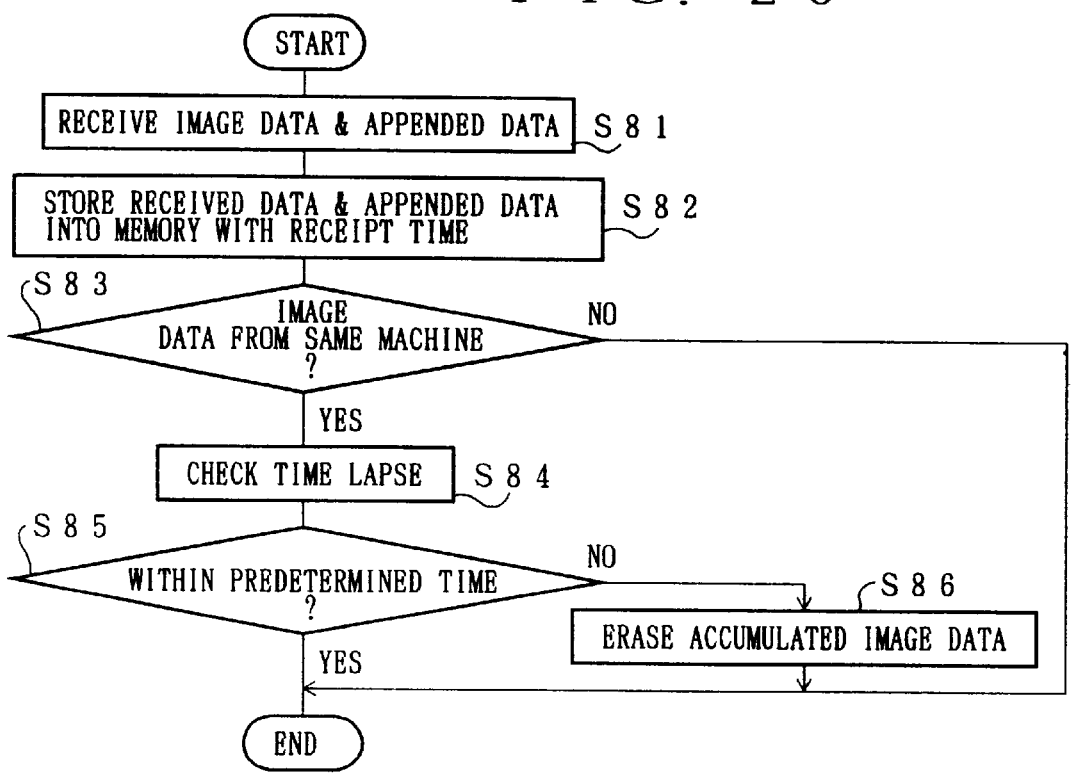
FIG. 20 is a flowchart detailing an operation of an image forming system in accordance with a further example embodiment of the present invention, and it details an operation of erasing image data stored on behalf of another digital copying machine at its request.

Referring to FIG. 20, the following description will describe a further example embodiment of the present invention. Hereinafter, like components are labeled with like reference numerals with respect to the Embodiments 1 and 2, and the description of these components is not repeated for the explanation's convenience.

Assuming that the same request-sender digital copying machine issues another store request, then how the digital copying machine 93 handles the image data stored in the memory 73 at the preceding store request will be explained.

To be more specific, the digital copying machine 93 erases the image data stored in its own memory 73 at the preceding store request upon receipt of another store request from the same digital copying machine, so that only the invalid image data are erased in a reliable manner.

If the appended data are used to identify the request-sender digital copying machine for each store request as previously mentioned, it can be readily confirmed whether both the current and preceding store requests were issued by the same digital copying machine or not.

However, it is important to judge whether a group of the image data transferred at regular time intervals should be processed as a single document, or separate documents. Because even when the image data of the document are transferred per page, the image data for each page are not necessarily transferred at regular intervals, in other words, the intervals can vary.

Thus, a predetermined level is set to a minimum time interval guaranteed by each apparatus in the image forming system according to its operation level, and the image data transferred within this predetermined time are stored in the memory 73 as those of a single document whether they are transferred at regular or irregular intervals. On the other hand, even when a group of the image data are transferred from the same digital copying machine, the image data transferred after the predetermined time has passed are stored in the memory 73 as those of a separate document from the document transmitted within the predetermined time.

The above operation of the digital copying machine 93 is detailed by the flowchart of FIG. 20. For example, upon receipt of the image data and appended data from the digital copying machine 92 (S81), the digital copying machine 93 stores the same into its memory 73 together with the data indicating a receipt time (S82). Then, the digital copying machine 93 checks whether the latest image data are transferred from the same digital copying machine (herein machine 92) that has issued the preceding store request (S83). If so, the lapse time is checked (S84) to determine whether the latest image data are transferred within the predetermined time since the second latest image data were transferred at the preceding store request (S85). If the latest image data are transferred within the predetermined time, the digital copying machine 93 does not take any action; otherwise, the digital copying machine 93 erases the other image data accumulated in the memory 73 prior to the latest image data (S86).

The present image forming system is arranged in such a manner that the digital copying machine 93 stores the image data temporarily in its memory 73 on behalf of the digital copying machine 92, and returns the same only after it has received the return request from the digital copying machine 92. However, there may be a case that the digital copying machine 93 has not received the return request for a considerable period.

Under these conditions, if the image data are transferred from the digital copying machine 92 again, it is most likely that the digital copying machine 92 has already produced a printed record of the image data stored in the memory 73 of the digital copying machine 93, and is now operating for another document. Thus, most of these cases, the image data stored in the memory 73 are no longer valid.

Therefore, the digital copying machine 93 judges that the image data that have been stored at the preceding store request should be erased.

In the present embodiment, the PCU 74 of the digital copying machine 93 serving as judging means confirms whether the latest image data are also transferred from the digital copying machine 92 that has issued the preceding store request based on the appended data, such as the machine ID No., every time the digital copying machine 93 receives a store request.

If the PCU 74 of the digital copying machine 93 confirms that the latest image data are transferred from the digital copying machine 92 that has issued the preceding store request, the digital copying machine 93 erases the image data stored in its own memory 73 on behalf of the digital copying machine 92 at its preceding store request under the control of the PCU 74.

Consequently, the digital copying machine 93 can reduce the capacitive burden of its memory 73 by erasing invalid image data.

However, note that the present image forming system is arranged in such a manner that the digital copying machine 93 does not erase the image data stored in its memory 73 at the preceding store request from the digital copying machine 92 unconditionally. The digital copying machine 93 inhibits the erasing of the image data under certain conditions.

For example, it can be arranged that the digital copying machine 93 does not erase any image data in the memory 73 until a predetermined time has passed.

Therefore, the digital copying machine 93 judges a group of the image data transferred within the predetermined time as being the image data of a single document. For example, even when a group the image data of several pages out of a 50-page document are transferred at random or the image data of the first and twentieth pages of the document are transferred separately at a moderate time interval, it has become possible to prevent the erroneous erasing of the image data by judging the group of the image data as belonging to separate documents.

(Embodiment 4)

Figure 21:
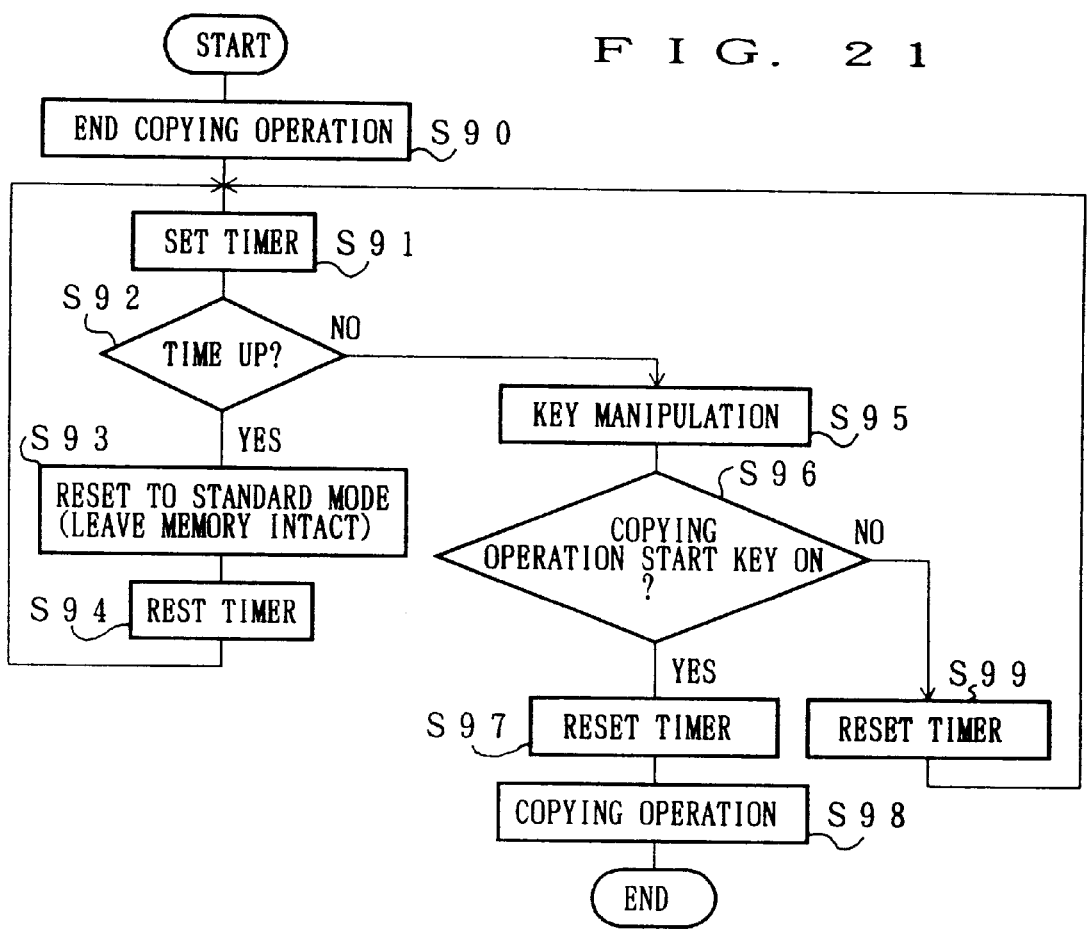
FIG. 21 is a flowchart detailing an operation of an image forming system in accordance with still another example embodiment of the present invention, and it details an auto-clear operation of image data stored on behalf of another digital copying machine at its request.

Referring to FIG. 21, the following description will describe still another example embodiment of the present invention. Hereinafter, like components are labeled with like reference numerals with respect to Embodiments 1–3, and the description of these components is not repeated for the explanation's convenience.

A typical digital copying machine is provided with an auto-clear function that resets the copy quantity, copying mode, etc. to the initial state after a predetermined time has passed since the copying operation ends. However, it is not desirable if the request-receiver digital copying machine erases all the image data stored therein including those stored on behalf of the request-sender digital copying machine each time the auto-clear function is effected.

To eliminate this problem, the image forming system of the present embodiment is arranged in such a manner that the image data are not erased unless a predetermined time has passed even when all the other functions of the request-receiver digital copying machine are reset by the auto-clear function.

The above operation will be detailed with reference to the flowchart of FIG. 21. To begin with, when the digital copying machine 93 ends the copying operation (S90), the digital copying machine 93 sets its timer (S91). In the meantime, the digital copying machine 93 checks whether the time is up or not (S92), and if the time is up, the digital copying machine 93 resets itself to the standard mode by effecting the auto-clear function. Note that, however, the image data storing area in the memory 73 is left intact at this point (S93). Next, the digital copying machine 93 resets the timer and returns to S91.

On the other hand, when the time is not up yet in S92 and the operator has manipulated keys (S95), whether the copying operation start key 15 is pressed or not is checked (S96). If so, the digital copying machine 93 resets the timer (S97), and carries out the copying operation (S98) If the start key 15 has not been pressed, the digital copying machine 93 resets the timer (S99) and returns to S91.

Thus, in the image forming system of the present embodiment, the PCU 74 of the digital copying machine 93 is provided to serve as reset means for erasing the image data in the memory 73 based on an auto-clear reset signal, and also to serve as inhibiting means for inhibiting the erasing of the image data and appended data stored in the memory 73 on behalf of any other digital copying machine (machine 92, herein) at its request.

In other words, a typical digital copying machine is arranged to reset itself to the initial state based on the auto-clear reset signal when a predetermined time has passed since the copying operation ends.

Naturally, the digital copying machine 93 of the present embodiment resets itself in response to the auto-clear signal and erases the image data in its own memory 73.

However, it is not desirable if the digital copying machine 93 erases the image data stored in its memory 73 on behalf of any other digital copying machine as well by effecting the auto-clear function.

To eliminate this problem, when the digital copying machine 93 resets itself in response to the auto-clear reset signal, the PCU 74 inhibits the erasing of the image data and appended data stored in its memory 73 on behalf of any other digital copying machine.

Consequently, it has become possible to inhibit the erroneous erasing of the image data temporarily stored in the memory 73 of the digital copying machine 93 on behalf of the digital copying machine 92.

(Embodiment 5)

Figure 22:
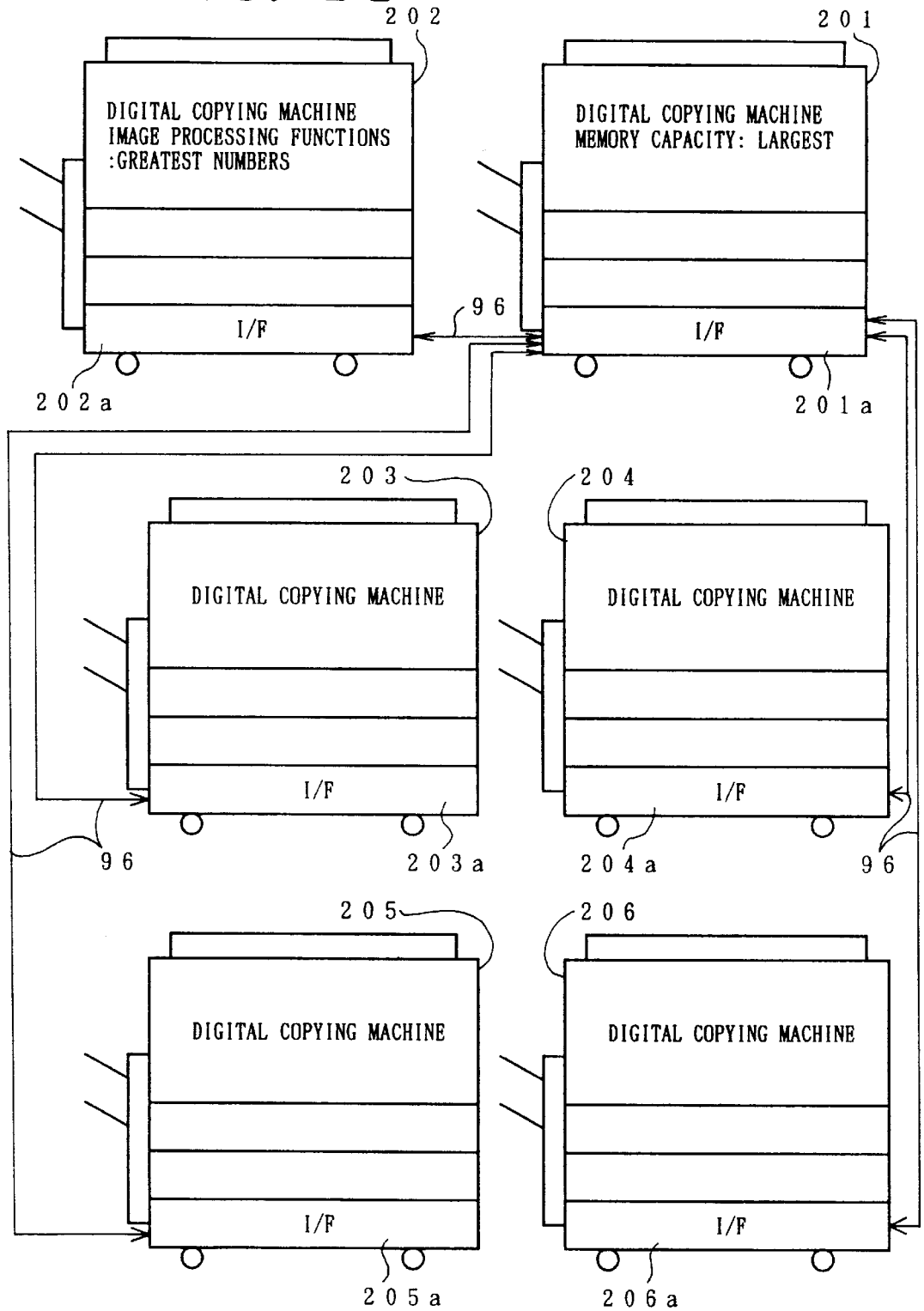
FIG. 22 is a view explaining a schematic structure of an image forming system in accordance with still another example embodiment of the present invention.
Figure 23:
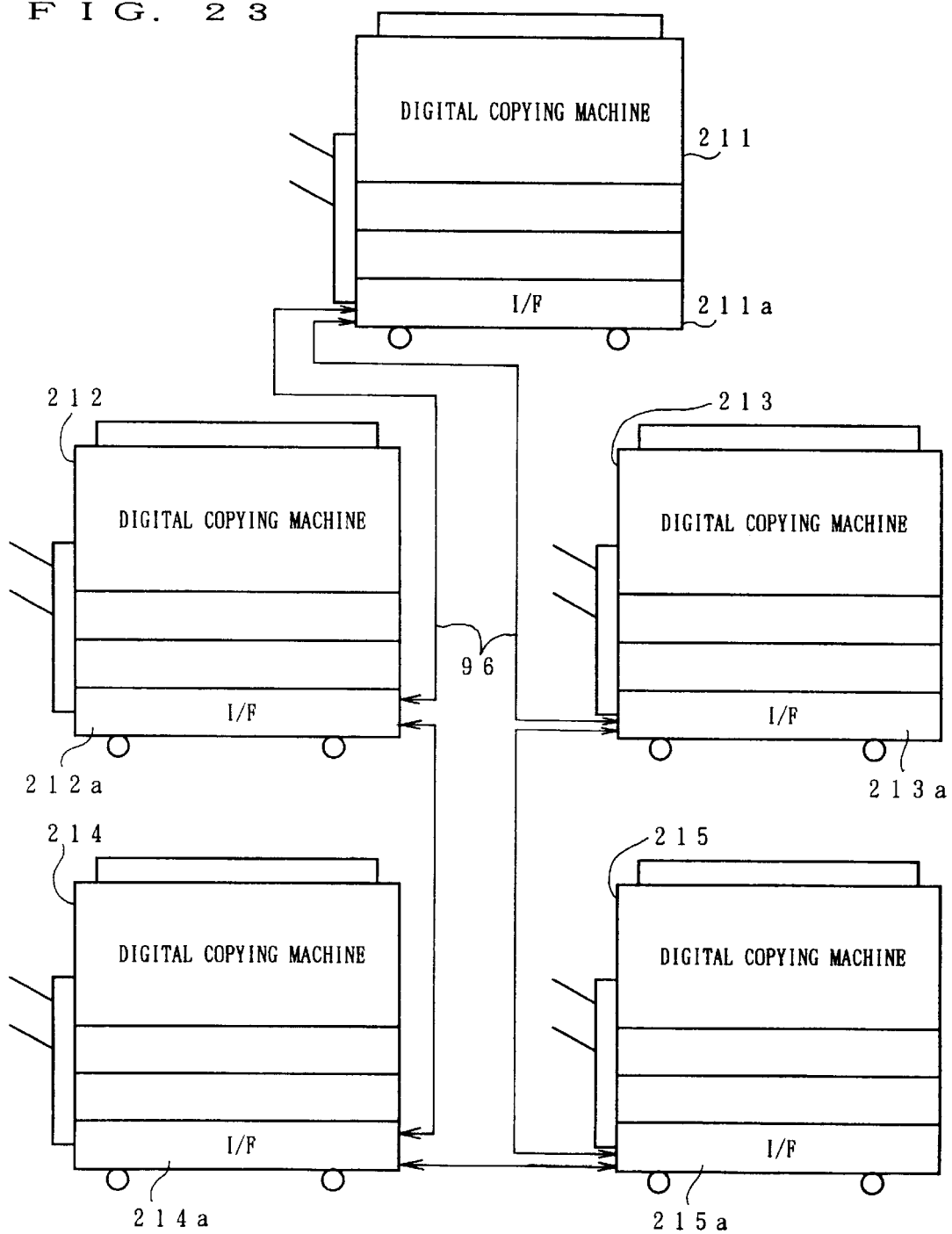
FIG. 23 is a view explaining a schematic structure of an image forming system in accordance with still another example embodiment of the present invention.

Referring to FIGS. 22 and 23, the following description will describe still another example embodiment of the present invention. Hereinafter, like components are labeled with like reference numerals with respect to Embodiments 1–4, and the description of these components is not repeated for the explanation's convenience.

As shown in FIG. 22, an image forming system of the present embodiment includes six digital copying machines 201–206, which include interfaces 201a–206a, respectively to enable mutual data transmission. The digital copying machine 201 having the largest memory and the digital copying machine 202 having the greatest number of image processing functions constitute a main digital copying machine, namely, the second image forming apparatus.

The digital copying machines 201 serving as a first main digital copying machine and the digital copying machine 202 serving as a second main digital copying machine are connected to each other through their respective interfaces 201a and 202a and the transmission line 96. Likewise, the digital copying machine 203–206 are connected individually to the digital copying machine 201 through their respective interfaces 203a–206a, 201a, and the transmission lines 96. Hence, the digital copying machines 202–206 are interconnected through the digital copying machine 201 for mutual data transmission.

As previously mentioned, in the present image forming system, the digital copying machines 201 and 202 constitute the main digital copying machine which carries out the operations explained in Embodiment 1 above. For example, the digital copying machine 202 corresponds to the digital copying machine 93 of FIG. 11, and the digital copying machine 201 has a larger memory and fewer image processing functions than the digital copying machine 93. Also, the digital copying machines 203 and 204 correspond to the digital copying machine 92 in function and the digital copying machines 205 and 206 correspond to the digital copying machine 91 in function.

In the main digital copying machine, the digital copying machine 201 is responsible for managing the image data demanding the memory 73 with a large capacity, while the digital copying machine 202 is responsible for the image processing. To be more specific, when the digital copying machine 203 issues a job request of image processing, the image data sent from the digital copying machine 203 are stored in the memory 73 of the digital copying machine 201, and steadily sent therefrom to the digital copying machine 202 to be processed.

The processed image data are stored in the memory 73 of the digital copying machine 201 again, and returned therefrom to the digital copying machine 203. The above operation is carried out under the control of, for example, the PCU 74 of the digital copying machine 201.

When the main digital copying machine is composed of a plurality of digital copying machines each taking their respective roles, not only the cost can be saved, but also the overall efficiency of the image forming system can be improved compared with a case of purchasing a single digital copying machine provided with high-grade functions.

Alternatively, the image forming system of the present embodiment may be modified in the following manner.

As shown in FIG. 23, the alternative image forming system comprises five digital copying machines 211–215, which have their respective transmission interfaces 211a–215a. The digital copying machines 211–275 are interconnected through the interfaces 211a–215a and the transmission lines 96 to constitute a loop network. Each of the digital copying machines 211–215 is identical with the digital copying machine 30 in structure.

In the present image forming system, if any of the digital copying machines 211–215 the operator is manipulating does not have a desired image processing function, the manipulated digital copying machine issues a job request to the other digital copying machines to carry out that particular function on its behalf. To realize above arrangement, each of the digital copying machines 211–215 withholds data as to the image processing functions and memory capacities of the other digital copying machines. The job request can be issued either automatically or manually. In case that the job request is issued manually, the digital copying machines that have the desired function are displayed on the liquid crystal display device 1, and the operator selects the digital copying machine from those displayed on the screen.

The present image forming system is arranged to operate in the same manner as its counterpart in Embodiment 1. Here, it is not the main digital copying machine that receives a job request from t he request-sender digital copying machine, but the digital copying machine having a specific image processing function the operator wishes to use.

The present image forming system, in which the main digital copying machine is not specified, is advantageous when each of the digital copying machines 211–215 has different image processing functions.

(Embodiment 6)

Referring to FIGS. 24–27, the following description will describe still another example embodiment of the present invention.

Figure 24:
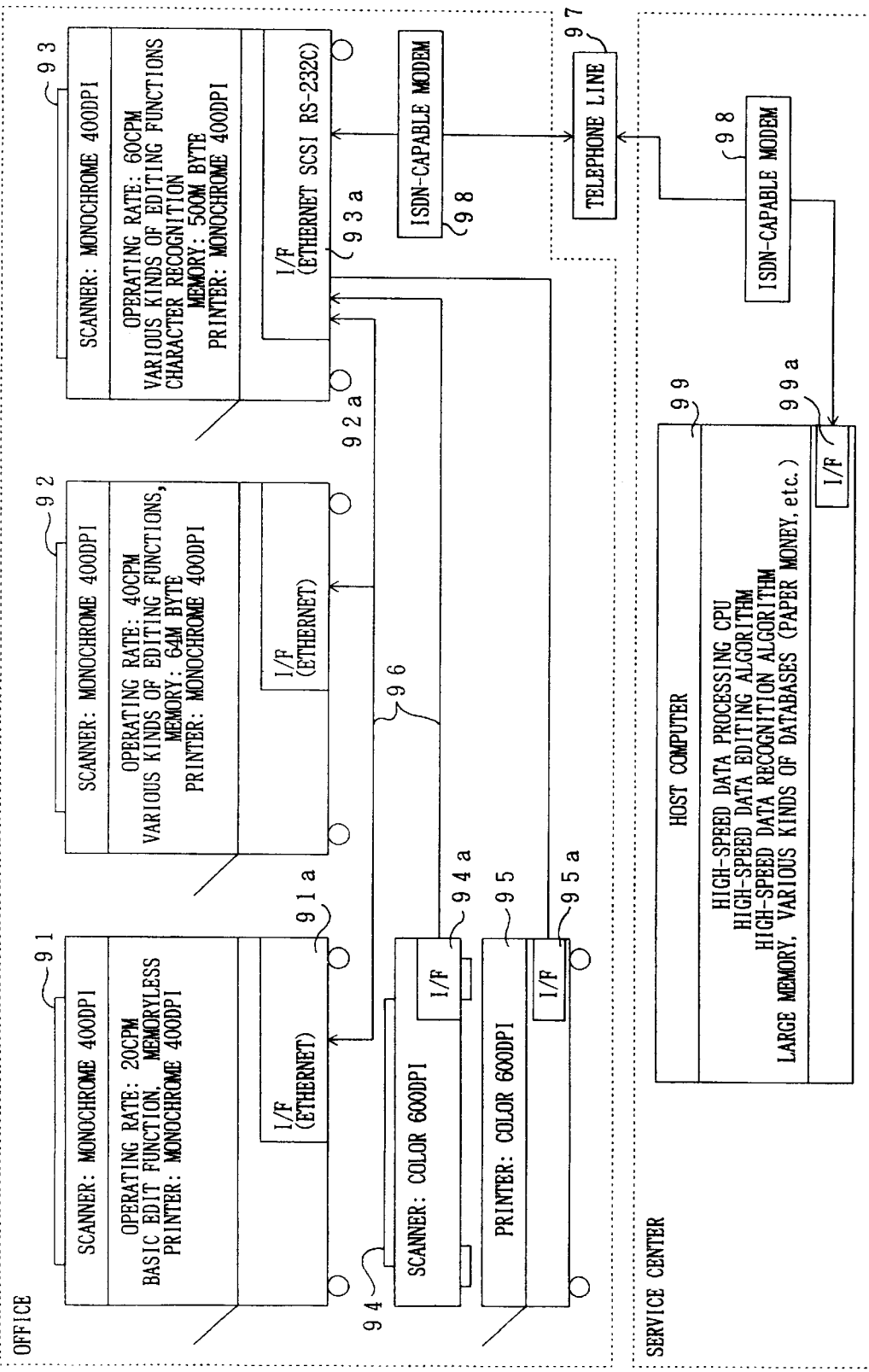
FIG. 24 is a view explaining a schematic structure of an image forming system in accordance with still another example embodiment of the present invention.

As shown in FIG. 24, an image forming system of the present embodiment includes three digital copying machines 91–93, a scanner 94, and a printer 95 serving as an image forming apparatus installed in an office, and a large-scale host computer 99 serving as an image processing apparatus installed in an external service center. The service center provides various kinds of data service including high-quality image processing.

The scanner 94 and printer 95 are connected to the digital copying machine 93 through interfaces 94a and 95a, respectively, so that each can transmit data mutually with the digital copying machine 93. Note that the image data transmission unit 81 of FIG. 4 corresponds to, for example, the interface 93a alone, or both the interface 93a and a modem 98 of the digital copying machine 93 of FIG. 24.

The host computer 99 includes a high-speed data processing CPU, a high-speed editing algorithm, a high-speed data recognizing algorithm, a memory with a capacity far larger than the memory 73, various kinds of databases for recognizing paper money or the like, and an interface 99a.

The digital copying machine 93 and host computer 99 are connected to each other through their respective interfaces 93a and 99a and a telephone line 97. Note that the telephone line 97 may be replaced with any other adequate transmission line 96, such as optical fibers. Two general ISDN (Integrated Services Digital Network)—capable modems (modulator) 98 are provided to the digital copying machine 93 and host computer 99, respectively. Each modem 98 converts a digitalized electric signal into a signal which can be transmitted through the telephone line 97. Each modem 98 adopts the PM (Phase Modulation) method, AM (Amplitude Modulation) method, FM (Frequency Modulation) method, or the like. Herein, the interfaces 91a–95a and 99a, transmission lines 96, telephone line 97, two modems 98 constitute the transmitting apparatus. The kinds of data this device can handle are previously explained.

The digital copying machines 91–93 and host computer 99 can mutually transmit various kinds of data, such as control command codes and bit data represented by image contrast data, through the telephone line 97.

A single office is connected to the service center in FIG. 24; however, a great number of users' offices throughout the nation are connected to the service center in practice.

Also, the job of the host computer 99 is to provide high-quality image processing functions including image edit functions and high-speed image processing, and the host computer 99 includes at least the functions provided to an ordinary digital copying machine. However, the host computer may omit too basic functions provided to an inexpensive model. In short, the host computer 99 includes only the adequate functions the service center is expect to provide.

Incidentally, new image processing functions have been steadily developed in accordance with the demand of constructing infrastructure or improvement in work efficiency. Thus, new processing functions can be added to the host computer 99, or replace with the processing functions used less frequently.

Here, example image edit functions provided to the digital copying machines 91–93 and host computer 99 are tabulated for ready comparison in Table 3 below.

TABLE 3

| IMAGE EDIT FUNCTION | MACHINE 91 | MACHINE 92 | MACHINE 93 | COMPUTER 99 |
|---|---|---|---|---|
| INDEPENDENT SCALING | ○ | ○ | ○ | ○ |
| SHARPNESS |  | ○ | ○ | ○ |
| BINDING MARGIN | ○ | ○ | ○ | ○ |
| FRAME ELIMINATION | ○ | ○ | ○ | ○ |
| CENTERING |  | ○ | ○ | ○ |
| 1-SET-2-COPY |  | ○ | ○ | ○ |
| ADDRESSED COPY |  |  | ○ | ○ |
| MULTI-SHOT |  | ○ | ○ | ○ |
| TRIMMING-MASKING |  | ○ | ○ | ○ |

TABLE 3-continued

| IMAGE EDIT FUNCTION | MACHINE 91 | MACHINE 92 | MACHINE 93 | COMPUTER 99 |
|---|---|---|---|---|
| MOVE | | o | o | o |
| SYNTHESIS FUNCTION | | | o | o |
| MONOCHROMIC INVERSE | o | o | o | o |
| CROSSHATCH/SHADE | | | | |
| SHADOW-OUTLINE | | | o | o |
| ITALIC-MIRROR IMAGE | | | o | o |
| REPEAT COPY | o | o | o | o |
| 2-IN-1-COPY | | | o | o |
| DATED COPY-CENTER MARK | | | o | o |
| ENLARGE/DIVIDE OUTPUT | | | | o |
| TRANSLATION | | | | o |
| HIGH-QUALITY PROCESSING | | | | o |

Data related to these functions are stored in the memory 73 of each digital copying machines 91–93, and the PCU 74 of each machine refers these data when necessary.

The present image forming system of FIG. 24 is arranged in the same manner as its counterpart of FIG. 11. To be more specific, the digital copying machine 93 having the greatest number of image processing functions and largest memory 73 serves as the main digital copying machine, and the other digital copying machines 91 and 92, scanner 94 and printer 95 are connected to the same.

In case that the operator selects the sharpness function when he is manipulating the digital copying machine 91, the job is carried out as was detailed by the flowchart of FIG. 15. Likewise, in case the memory 73 of the digital copying machine 93 is shared by any other image digital copying machine, the job is carried out as was detailed by the flowchart of FIG. 16.

Next, the description will be given as to how the digital copying machine 93, serving as the request-receiver second image forming apparatus, erases the image data stored in its own memory 73 at the request from and on behalf of the digital copying machine 92, serving as the request-sender first image forming apparatus.

Like the aforementioned counterparts, the present image forming system is arranged in such a manner that the digital copying machine 93 erases the image data and appended data stored in its own memory 73 at the request from and on behalf of the digital copying machine 92 to reduce the capacitive burden of the memory 73 when the digital copying machine 93 has not received a return request from the digital copying machine 92 for a considerable period. However, unlike the above counterparts, this operation is carried out based on transfer history data made in record since the store request was received.

The transfer history data are stored in the form of a managing t able at a storage are a secured for its exclusive use in the memory 73 of the digital copying machine 93, and displayed on the liquid crystal display device 1.

Figure 25:
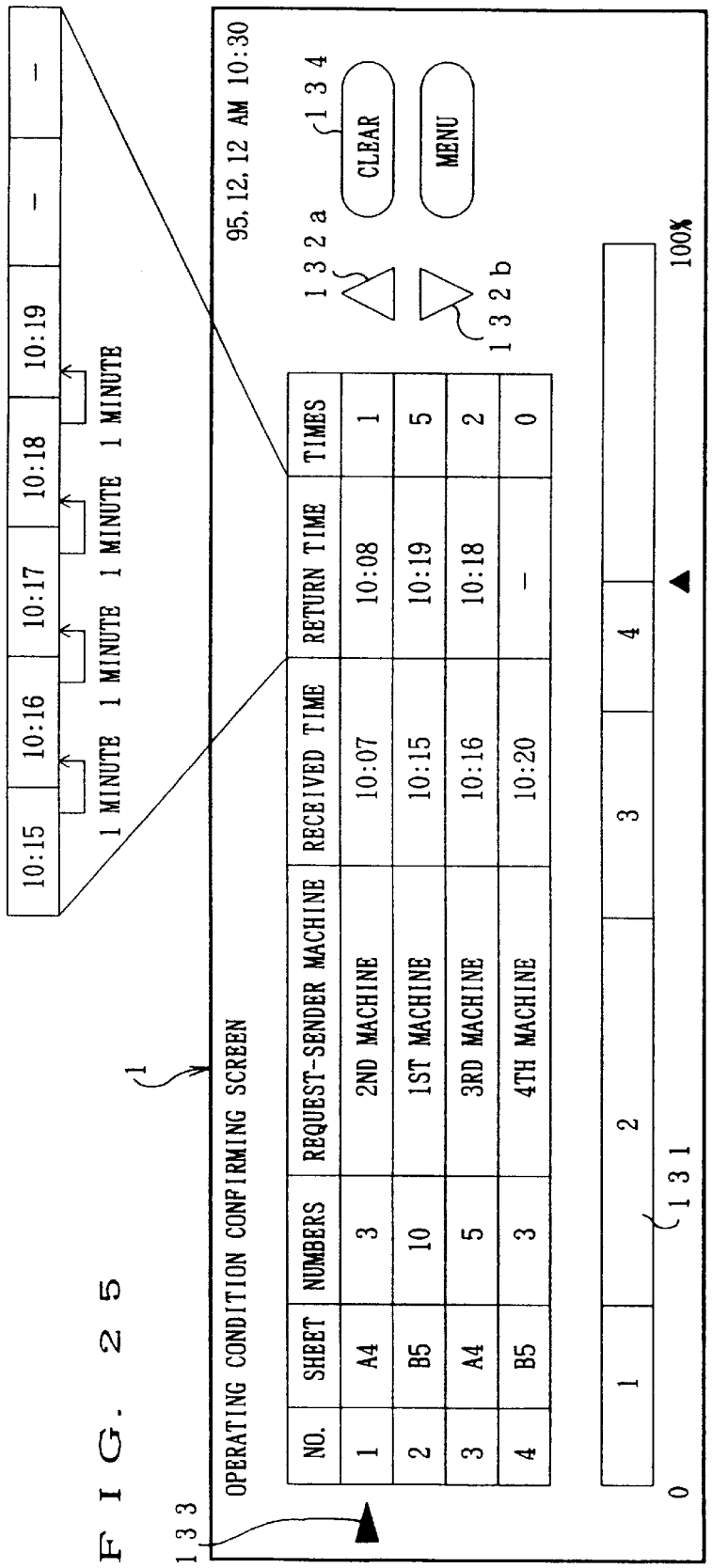
FIG. 25 is a front view illustrating a liquid crystal display device in a control panel of a digital copying machine in the image forming system of FIG. 24 when displaying transfer history data.

To be more specific, as shown in FIG. 25, the screen displays a table containing: "No." indicating serial numbers of the requests; "sheet" indicating the size of the document in question; "quantity" indicating the quantity of the document in question; "request-sender machine" identifying the digital copying machine that has sent the store request to store the image data on its behalf; "receipt time" indicating the time at which the transferred image data are stored in the memory 73; "return time" indicating the time at which the image data are returned; and "times" indicating how many times the image data are returned to the request-sender digital copying machine.

In the above example, only one return time is displayed in the "return time" column; however, all the return times may be displayed when the image data have been returned more than once. This arrangement not only makes it possible to learn the image data return cycle, but also facilitates the management using other data, which will be described below.

Of all the above display contents, "receive time", "latest return time", "cycle", and "times" make up the transfer history data. However, the transfer history data are not limited to these contents, and other kinds of data can be contained as well. Each content of the data can be displayed by scrolling the display screen.

Also, the current state of the memory 73 are indicated in an available memory indicating portion 131 in the bottom of the display of FIG. 25 to enable the operator to confirm the current condition and available capacity of the memory 73. An up key 132a and a down key 132b are provided in the right side of the display screen. A cursor 133 displayed at the left side of the table can be moved vertically by pressing the up key 132a and down key 132b. To erase the respective image data from the memory 73, the operator selects the desired image data by moving the cursor 133 next to the corresponding serial No. and presses a clear key 134.

Managing the return conditions of the stored image data as the transfer history data makes it possible to erase the respective image data in the memory 73 either automatically or manually.

Figure 26:
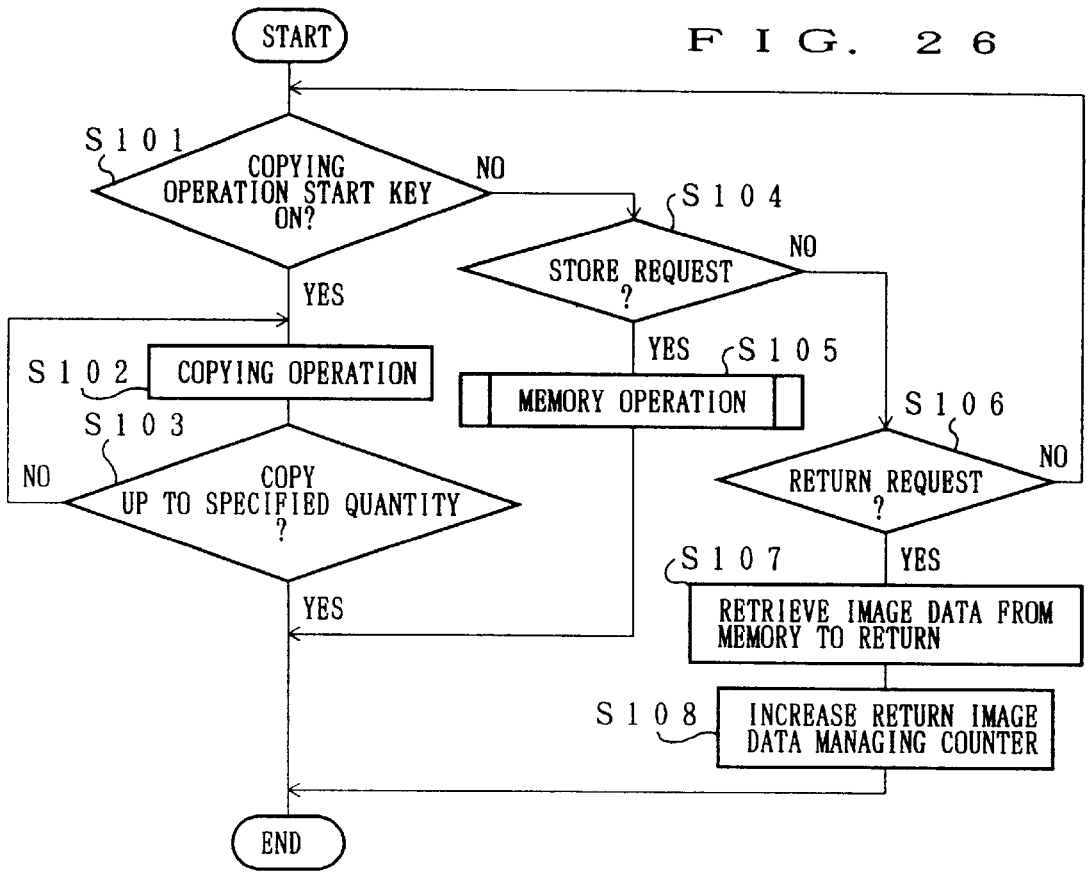
FIG. 26 is a flowchart detailing a memory operation in the image forming system of FIG. 24.

Next, a case where the digital copying machine 93 erases the image data based on the "times" in the transfer history data will he explained with reference to the flowchart of FIG. 26. Assume that the digital copying machine 93 shares its own memory 73 with the digital copying machine 93 herein.

To beg in with, the digital coping machine 93 checks whether the operator has pressed the copying switch, namely, the start key 15, (S101). If the operator has pressed the start key 15, the digital copying machine carries out the copying operation (S102), and in the meantime, checks whether a specified quantity of copies are made to end the operation (S103).

When the operator has not pressed the start key 15 yet in S101, the digital copying machine 93 checks whether it has received a store request (S104). When the digital copying machine 93 has received the store request, it carries out memory processing (S105), which will be detailed below (S105).

When the digital copying machine 93 has not received any store request in S104, the digital copying machine 93 checks whether it has received any return request from the digital copying machine 92 (S106). Upon receipt of the return request, the digital copying machine 93 retrieves the image data from its own memory 73 and returns the same to the digital copying machine 92 (S107), and after which the digital copying machine 93 increases the return image data managing counter by one (S108).

On the other hand, in case of no return request in S106, the digital copying machine 93 returns to S101.

Figure 27:
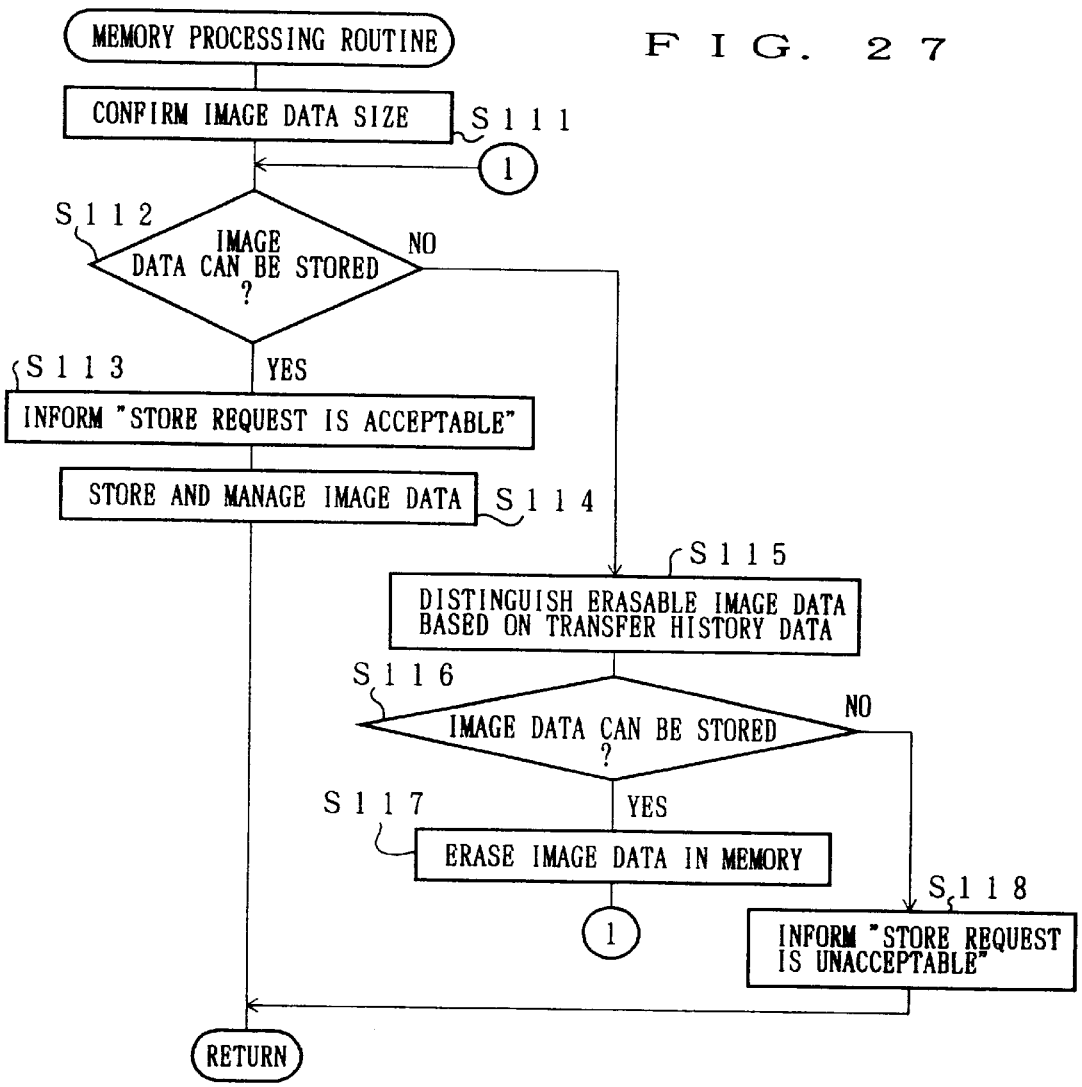
FIG. 27 is a flowchart further detailing the memory operation of FIG. 26.

The above memory processing in S105 will be detailed with reference to the flowchart of FIG. 27.

Upon receipt of the store request, the digital copying machine 93 checks the data size (volume) (S111), and judges whether its own memory 73 can store the same or not by comparing the checked data volume with the available capacity of the memory 73 (S112).

When the memory 73 can store the image data, the digital copying machine 93 so informs the digital copying machine 92 (S113), and receives the image data from the digital copying machine 92 to store and manage the same (S114).

When the memory 73 can not store the image data, the digital copying machine 93 checks whether any stored image data can be erased or not based on the transfer history data (S115).

To be more specific, the PCU 74 of the digital copying machine 93 checks the "times" in the transfer history data. When the "times" shows 0, the PCU 74 judges that the image data have never been returned, and therefore, the image data can not be erased. When the "times" shows 1, the PCU 74 judges that the image data are returned to the digital copying machine 92 once and have less likelihood of receiving a return request again. Thus, PCU 74 judges that the image data in question can be erased. When the "times" shows 2 or greater, the PCU 74 judges that the digital copying machine 92 is set in a mode that demands the image data repetitively. Thus, it is preferable that the PUC 74 judges that the image data can not be erased.

When there are any erasable image data according to the above judgment (S116), the PCU 74 of the digital copying machine 93 erases the corresponding image data from the memory 73 (S117).

On the other hand, when no image data are judged as being erasable in S116, the digital copying machine 93 informs the digital copying machine 92 that it cannot accept the store request (S118).

In S116, the judgment is made based on the "times" in the transfer history data; however, the same can be done based on the "return time". In other words, the same can be done based on the lapse time since the image data were returned last time.

To be more specific, if the digital copying machine 93 has not received another return request within a predetermined time since the image data were returned at the last return request, the digital copying machine 93 judges that no more return request will be issued for the image data in question, and therefore, the same can be erased.

However, the above predetermined time varies depending on the performance level of each digital copying machine within the image forming system. Thus, the present image forming system is arranged in such a manner that the above predetermined time can be set arbitrary for each digital copying machine based on its performance level.

Alternatively, the "return timer" may be used in the following manner. That is, as shown in FIG. 25, the return time is recorded each time the image data are returned, and a return request cycle is computed based on the recorded data. If no return request is issued within the cycle thus computed since the last return request, it is least likely that another return request will be issued. Thus, the digital copying machine 93 judges that the image data in question can be erased. In the example of FIG. 25, the last five return requests were issued in every one minute, but the latest return request has not been issued more than one minute later since the fifth return request was issued. Thus, if no return request is issued within the time predetermined based on the return request cycle, the corresponding image data are judged as being erasable.

Further, the digital copying machine 93 can always communicate with the request-sender digital copying machine 92 through the transmitting apparatus. Thus, the digital copying machine 93 may be arranged to erase the image data from its memory 73 only when a deterministic condition is satisfied. Example deterministic conditions are: "the digital copying machine 92 has returned a signal acknowledging the receipt of the image data" or "the digital copying machine 92 has outputted the image data and produced a printed record" after the image data were returned.

As has been explained, in the present image forming system, the PCU 74 of the digital copying machine 93 serves as transfer history data managing means for managing the transfer history data of the image data since the same were stored in its own memory 73, such as the number of times the image date were returned, the lapse time since the image data were returned for the last time, and the cycle of returning the image data.

Thus, if the digital copying machine 93 has not received any return request from the digital copying machine 92 for a considerable period, the digital copying machine 93 can check the transfer history data of the image data in question since the same were stored in its own memory 73, and erase the same to reduce the capacitive burden of the memory 73.

When the "times" in the transfer history data is adopted, not only the actual number of times the image data returned at request can be confirmed, but also the priority of the erasable image data can be determined.

To be more specific, when the "times" shows 0, the corresponding image data are placed at a lower rank, and when the "times" shows 2 or greater, the corresponding image data are placed at a higher rank. In so doing, the image data can be erased in a more accurate manner.

When the "lapse time" in the transfer history data is adopted, only the invalid image data can be erased in a reliable manner.

Moreover, as has been explained, the predetermined time can be set arbitrary for each digital copying machine within the image forming system depending on their respective performance levels.

This arrangement eliminates the problem causing when each digital copying machine issues a return request at different time intervals within the image forming system.

Further, when the "cycle" in the transfer history data is adopted, it can be predicted that no more return request will be issued for the particular image data if a return request has not issued within the predetermined cycle since the last return request was issued. Thus, the image data can be erased in a more accurate manner.

Also, in the present image forming system, the PCU 74 of the digital copying machine 93 serves as erasing means, which distinguishes the erasable image data based on the transfer history data and erases the distinguished image data in its memory 73.

Thus, when the digital copying machine 93 stores the image data in its own memory 73 on behalf of the request-sender digital copying machine (herein, machine 92) for a considerable period, the digital copying machine 93 erases such image data to reduce the capacitive burden of its memory 73 and utilize the same efficiently.

Further, when the digital copying machine 93 stores the image data in its own memory 73 on behalf of more than one digital copying machine, the digital copying machine 93 can erase respective image data selectively for a specific request-sender digital copying machine.

According to this arrangement, the digital copying machine 93 does not erase the image data stored in its memory 73 entirely; it erases only the image data that are no longer valid. Consequently, it has become possible to erase the image data in minimum volume, while leaving the image data that should be stored in the memory 73 intact.

In the present image forming system, before the image data are erased from the memory 73 of the digital copying machine 93, the PCU 74 of the same serving as available capacity detecting means judges whether the available capacity of the memory 73 is sufficient to store the image data transmitted with the store request. The digital copying machine 93 erases the image data only when the available capacity of its memory 73 is not sufficient to store the transmitted image data.

Thus, the digital copying machine 93 can withhold the image data in its own memory 73 on behalf of any other digital copying machine until the image data are stored up to its full while securing a storage area used exclusively for a particular function.

As a consequence, the digital copying machine 93 can secure a storage capacity in its memory 73 necessary for its own operation, while at the same time, withholding the image data, such as those to which a return request may be issued repetitively, in its memory 73 to its full. This arrangement can prevent the erroneous erasing of the valid image data.

In the present image forming system, the digital copying machine 93 can confirm whether it has received a signal acknowledging the receipt of the returned image data, or a signal informing producing a printed record of the returned image data from the digital copying machine 92 before it erases the image data from its own memory 73.

This arrangement enables the digital copying machine 93 to accurately distinguish the erasable image data from the image data that should be left intact, thereby inhibiting the storage of invalid image data in the memory 73 in a reliable manner.

As has been explained, the present image forming system is characterized in that:

the second image forming apparatus includes the available capacity detecting means for detecting an available capacity of the storage means; and the erasing means starts to erase the image data from the storage means based on the transfer history data stored in the transfer history data managing means when the available capacity detecting means judges that the available capacity is not sufficient to store the transmitted image data with a store request.

According to this arrangement, the second image forming apparatus can store the image data on behalf of the first image forming apparatus(es), while securing a storage capacity necessary for its own operation. In other words, it has become possible to store the image data to which a return request may be issued again as long as possible after the same were returned at the last return request, thereby preventing the erroneous erasing of the same.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming system comprising a first image forming apparatus, a second image forming apparatus, and a transmitting apparatus for connecting said first and second image forming apparatuses for mutual image data transmission, wherein, (1) said first image forming apparatus includes:

a recording section for forming a visible image based on image data;

a command input section for inputting an action command; and a control section for transferring said image data from said first image forming apparatus to said second image forming apparatus through said transmitting apparatus at a command, inputted through said command input section, to issue a store request to said second image forming apparatus to store said image data on behalf of said first image forming apparatus, and (2) said second image forming apparatus includes:

a storage section for storing image data;

an erasing section for erasing only said stored image data and information related to said stored image data in said storage section;

a transfer history data managing section for managing transfer history data as to returning of said stored image data to said fist image forming apparatus since said image data have been stored into said storage section; and a control section for storing said transferred image data from said first image forming apparatus into said storage section, and for performing, based on a return request issued by said first image forming apparatus, the operations of returning said stored image data to said first image forming apparatus through said transmitting apparatus without processing stored image data, and controlling erasing operations of said erasing section based on said transfer history data.

2. The image forming system as defined in claim 1, wherein:

said transfer history data managing section has an indicating section for indicating said transfer history data; and said erasing section erases said stored image data when a command to erase said stored image data is inputted through said input section.

3. The image forming system as defined in claim 1, wherein said erasing section judges whether said stored image data can be erased or not based on said transfer history data, and erases the image data judged as being erasable.

4. The image forming system as defined in claim 3, wherein said second image forming apparatus further includes an available capacity detecting section for detecting a volume of an available storage area in said storage section, whereby said erasing section erases said stored image data when a volume of the image data, for which said first image forming apparatus has issued a new store request, exceed said detected volume of the available storage area in said storage section.

5. The image forming system as defined in claim 3, wherein said transfer history data indicate the number of times said image data stored in said storage section are returned to said first image forming apparatus.

* * * * *